United States Patent [19]

Tobita et al.

[11] Patent Number: 5,176,424
[45] Date of Patent: Jan. 5, 1993

[54] AUTOMOBILE SEAT ASSEMBLY

[75] Inventors: Koji Tobita; Kouzou Hirota; Takeshi Takagi; Ken Kawamura, all of Hiroshima; Kazuki Fujise, Aki; Yoshiaki Kinoshita, Hiroshima, all of Japan

[73] Assignee: Mazda Motor Corporation, Hiroshima, Japan

[21] Appl. No.: 898,399

[22] Filed: Jun. 11, 1992

Related U.S. Application Data

[60] Division of Ser. No. 741,969, Aug. 6, 1991, abandoned, which is a continuation of Ser. No. 362,698, Jun. 7, 1989, abandoned.

[30] Foreign Application Priority Data

Jun. 10, 1988 [JP] Japan ................ 63-144368
Aug. 2, 1988 [JP] Japan ................ 63-193209
Apr. 12, 1989 [JP] Japan ................ 1-93895
May 12, 1989 [JP] Japan ................ 1-55040[U]
May 12, 1989 [JP] Japan ................ 1-55041[U]
May 12, 1989 [JP] Japan ................ 1-55042[U]

[51] Int. Cl.⁵ ............................................. A47C 7/02
[52] U.S. Cl. ........................... 297/284.1; 297/459; 297/DIG. 1; 297/452
[58] Field of Search .......... 297/284, 452, 458, 459, 297/DIG. 1, DIG. 2

[56] References Cited

U.S. PATENT DOCUMENTS

| | | | |
|---|---|---|---|
| 2,355,762 | 8/1944 | Van Derveer | 297/180 X |
| 3,377,103 | 4/1968 | Borton et al. | 297/180 X |
| 3,519,308 | 7/1970 | Kasman et al. | 297/218 X |
| 3,549,201 | 12/1970 | Wolfe | 297/284 |
| 3,608,961 | 9/1971 | Von Heck | 297/284 |
| 3,630,572 | 12/1971 | Homier | 297/218 X |
| 3,730,588 | 5/1973 | Braun | 297/452 X |
| 3,804,457 | 4/1974 | Hellman | 297/219 |
| 3,981,534 | 9/1976 | Wilton | 297/218 X |
| 4,114,214 | 9/1978 | VonHeck | |
| 4,553,393 | 11/1985 | Ruoff | |
| 4,634,179 | 1/1987 | Hashimoto et al. | 297/DIG. 3 X |
| 4,655,505 | 4/1987 | Kashiwamura et al. | 297/DIG. 3 X |
| 4,707,788 | 11/1987 | Tashiro et al. | |
| 4,716,731 | 1/1988 | Sakai et al. | |
| 4,722,550 | 2/1988 | Imaoka et al. | |
| 4,878,992 | 8/1989 | LaSota | |

FOREIGN PATENT DOCUMENTS

| | | |
|---|---|---|
| 143742 | 6/1985 | European Pat. Off. . |
| 290398 | 11/1988 | European Pat. Off. . |
| 0301938 | 2/1989 | European Pat. Off. . |
| 55-146118 | 11/1980 | Japan . |
| 58-53524 | 3/1983 | Japan . |
| 59-230833 | 12/1984 | Japan . |
| 60-16623 | 2/1985 | Japan . |
| 60-108248 | 7/1985 | Japan . |
| 60-108249 | 7/1985 | Japan . |
| 60-154925 | 8/1985 | Japan . |
| 60-174334 | 9/1985 | Japan . |
| 60-155359 | 10/1985 | Japan . |
| 61-86054 | 6/1986 | Japan . |
| 2168893 | 7/1986 | United Kingdom . |

OTHER PUBLICATIONS

Patent Abstracts of Japan, vol. 9, No. 107 (M-378), May 11, 1985; & JP-A-59230833 (Hitachi Seisakusho) Dec. 25, 1984 *abstract*.
Patent Abstracts of Japan, vol. 8, No. 191 (M-322)(1628), Sep. 4, 1984.
Patent Abstracts of Japan, vol. 11, No. 111 (M-578), Apr. 8, 1987.
Patent Abstracts of Japan, vol. 9, No. 77 (M-369), Apr. 6, 1985.

Primary Examiner—Peter R. Brown
Attorney, Agent, or Firm—Wenderoth, Lind & Ponack

[57] ABSTRACT

An automobile seat assembly includes a seat cushion subassembly and a seat back subassembly coupled with the seat cushion subassembly to represent a generally L-shaped configuration. A holding device is installed in the seat cushion subassembly and is deformable in response to the sitting of a seat occupant on a sitting area of the seat cushion subassembly and holds the sitting area in a deformed shape resulting from the seat occupant sitting on the sitting area. An actuating device installed in the seat cushion subassembly actuates the holding device. A detecting device detects the actual sitting position of the seat occupant on the sitting area. A control device is operable to operate the actuating device a predetermined time after the detecting device has detected the actual sitting position of the seat occupant on the sitting area.

8 Claims, 23 Drawing Sheets

Fig. 13
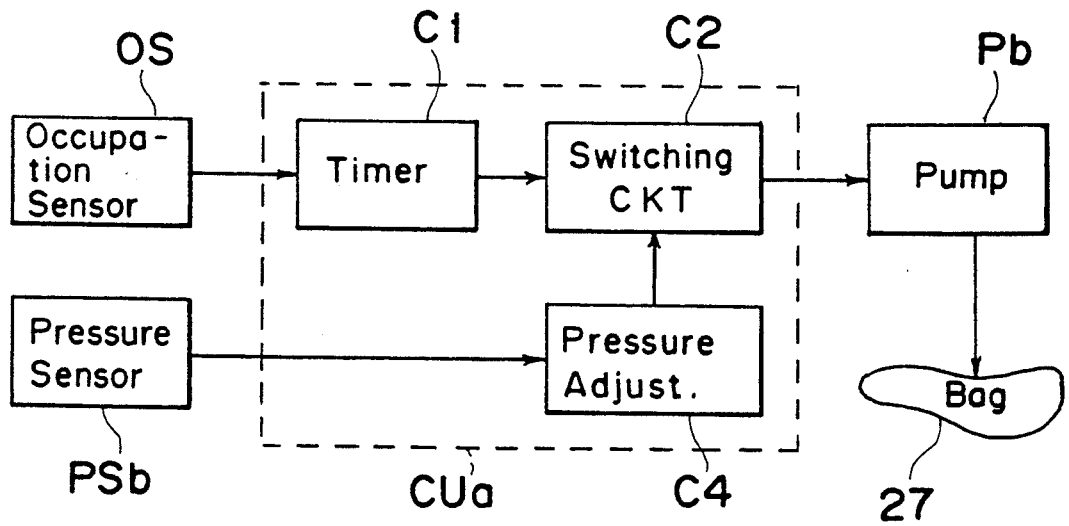
Fig. 14
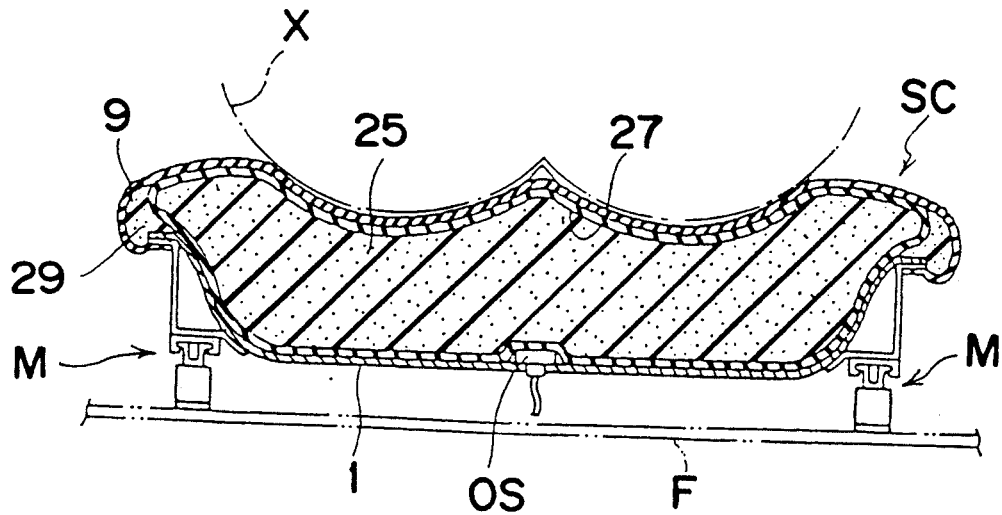
Fig. 15
Fig. 16
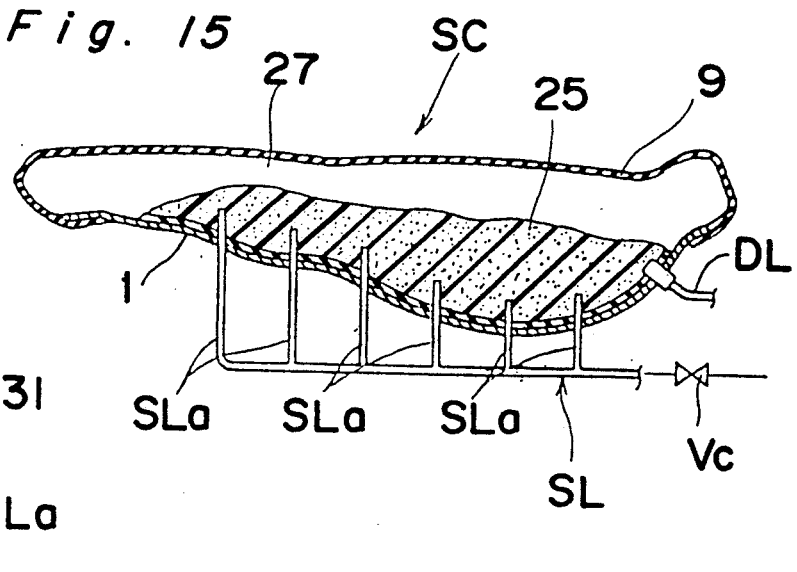

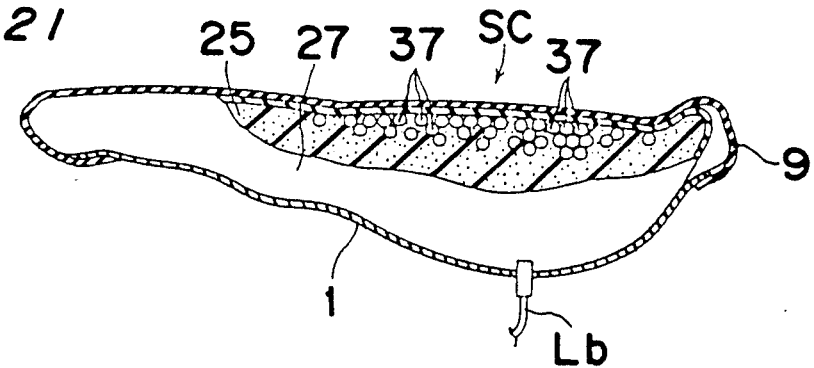
Fig. 21
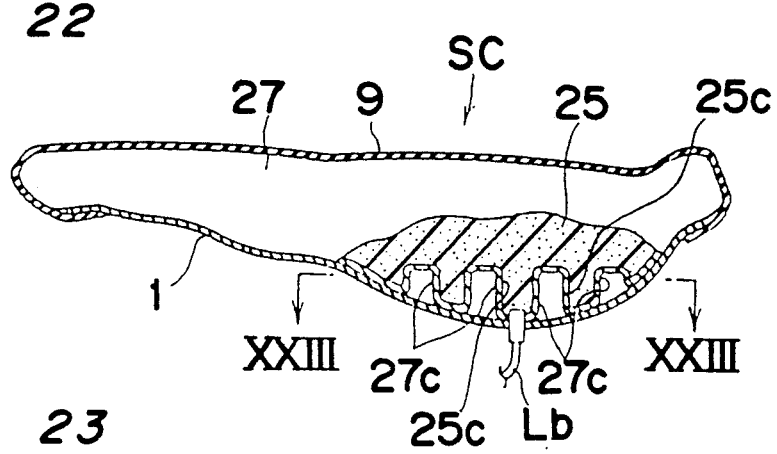
Fig. 22
Fig. 23
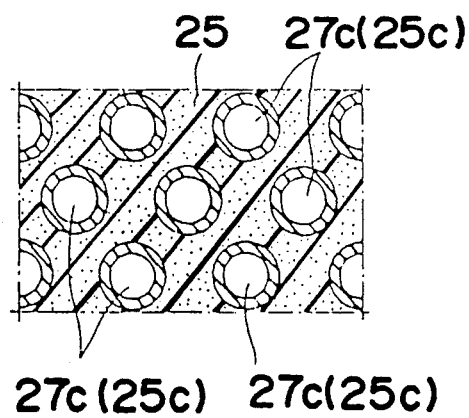
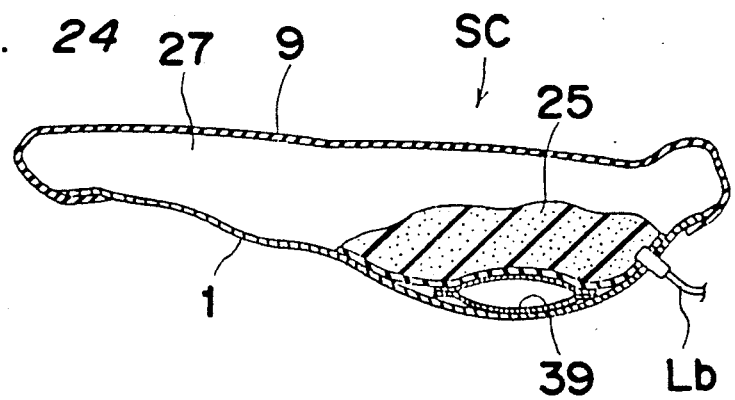
Fig. 24

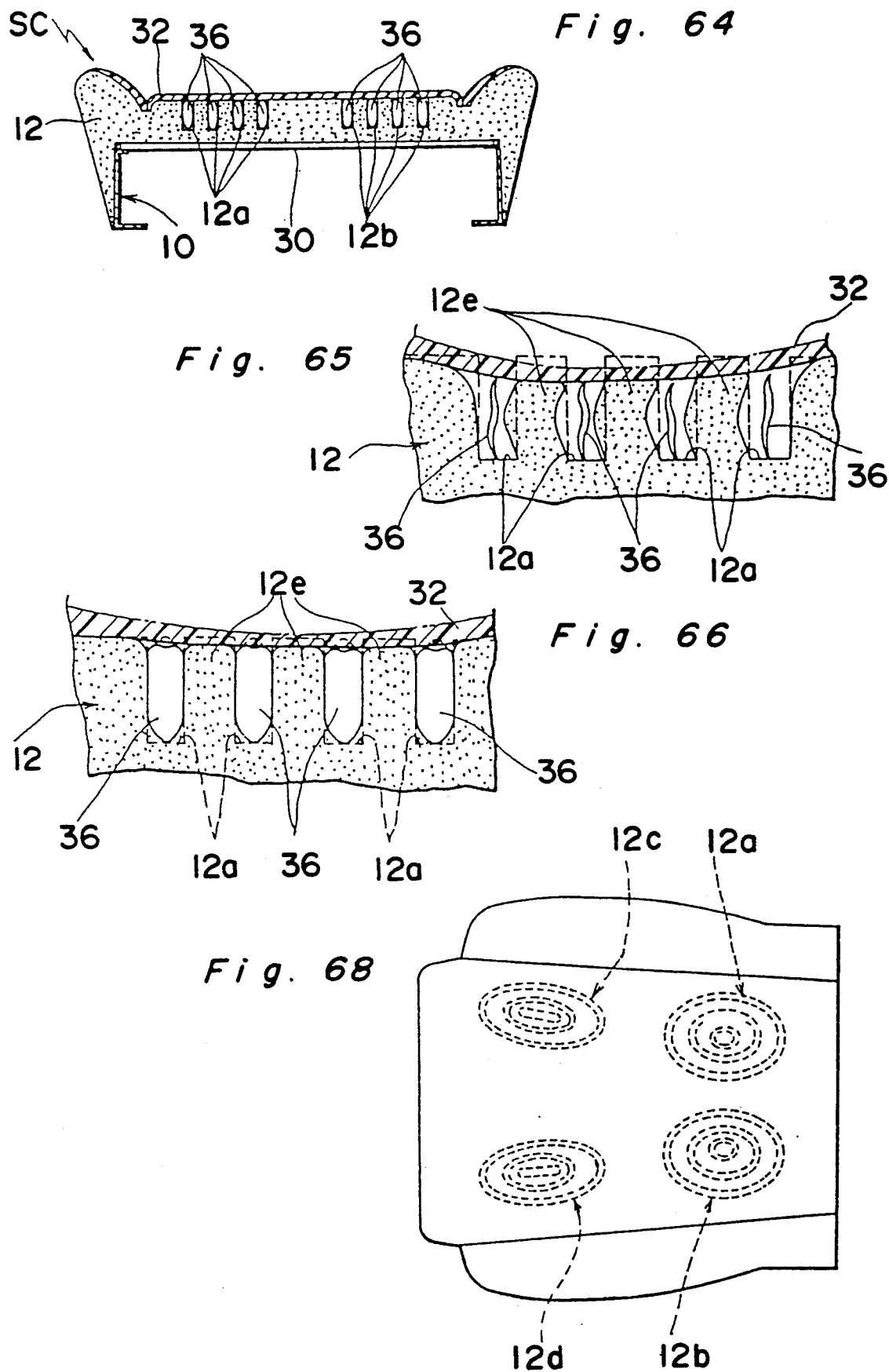

５,176,424

AUTOMOBILE SEAT ASSEMBLY

This application is a division of now abandoned application Ser. No. 07/741,969, filed Aug. 6, 1991 which was a continuation of now abandoned application Ser. No. 07/362,698, filed Jun. 7, 1989.

BACKGROUND OF THE INVENTION

1. Field of the Invention

The present invention generally relates to an automobile seat assembly.

2. Description of the Prior Art

An automobile seat assembly particularly for use by an automobile driver generally comprises a seat cushion subassembly and a seat back subassembly hingedly connected to the seat cushion subassembly to form a generally L-shaped configuration. The seat cushion subassembly comprises an elastic cushion pad mounted on a base frame structure and a seat covering either made of leather sheet or synthetic sheet material and enclosing the elastic cushion pad such as disclosed in, for example, the Japanese Laid-open Utility Model Publication No. 62-150232.

The automobile seat assembly generally is required to have a capability of providing a sensation of comfortable riding, a capability of providing a good holding or comfortable support to the seat occupant and also a capability of minimizing transmission of vibrations from an automobile body structure to the seat occupant. The capability of providing the sensation to the comfortable riding can be accomplished by the use of a relatively soft cushion pad. On the other hand, the capability of providing the property of good holding or support requires the use of a relatively stiff cushion pad.

Therefore, a compromise has hitherto been made to employ both of the relatively soft and stiff cushion pads in one seat cushion subassembly to provide the latter both with the capability of providing the sensation of comfortable riding and with the capability of providing the good holding or supporting property.

However, even though the seat cushion subassembly employs a double-layered seat cushion, that is, both of the relatively soft and stiff cushion pads, the sitting area of the seat cushion subassembly receives a pattern of distribution of pressure that varies from one seat occupant to another because of difference in physical build, that is, figure and weight. Therefore, the pressure imposed on the sitting area when a seat occupant sits thereon varies from one seat occupant to another and, accordingly, it has long been difficult to provide an automobile seat assembly capable of providing both the sensation of a comfortable ride and the property of good support.

SUMMARY OF THE INVENTION

Accordingly, the object of the present invention is to provide an improved automobile seat assembly wherein a holding means is provided for retaining a sitting area of a seat cushion subassembly in the form thereof as deformed as a result of the actual sitting of a seat occupant thereon so that the seat assembly can provide both the capability of providing the sensation of a comfortable ride and the property of good support regardless of differences in physical builds of different seat occupant.

In order to accomplish the above described object, the present invention provides an automobile seat assembly which comprises a seat cushion subassembly and a seat back subassembly coupled with the seat cushion subassembly to form a generally L-shaped configuration, a holding device, installed in the seat cushion subassembly and being deformable in response to the sitting of the seat occupant on the sitting area of the seat cushion subassembly, for holding the sitting area in a shape deformed as a result of the sitting of the seat occupant on the sitting area, an actuating device installed in the seat cushion subassembly for actuating the holding device, a detecting device for detecting the actual sitting of the seat occupant on the sitting area, and a control device operable to operating the actuating device a predetermined time after the detecting device has detected the actual sitting of the seat occupant on the sitting area.

BRIEF DESCRIPTION OF THE DRAWINGS

These and other objects and features of the present invention will become clear from the following description of preferred embodiments thereof with reference to the accompanying drawings, in which:

FIG. 13 is a circuit block diagram showing details of a control unit shown in FIG. 12;

FIG. 14 is a view similar to FIG. 10, showing the seat cushion subassembly when and after the seat occupant has sat thereon;

FIG. 15 is a side sectional view, similar to FIG. 11, of the seat cushion subassembly showing a first modification of the third embodiment of the present invention;

FIG. 16 a schematic elevational view, on an enlarged scale, of a free end portion of a plurality of tubes used in the modified seat cushion subassembly shown in FIG. 15;

FIGS. 17 to 22 side sectional views showing second to seventh modifications of the third embodiment of the present invention, respectively;

FIG. 23 is a cross sectional view, on a somewhat enlarged scale, taken along the line XXIII—XXIII in FIG. 22;

FIG. 24 is a side sectional view showing an eighth modification of the third embodiment of the present invention;

FIG. 64 is a cross-sectional view taken along the line LXIV—LXIV in FIG. 63;

FIGS. 65 and 66 are fragmentary sectional views, on an enlarged scale, of a portion of the seat cushion pad shown in FIG. 64, showing two different operative conditions, respectively;

FIG. 68 is a schematic top plan view of the seat cushion subassembly showing a modification of the seventh embodiment of the present invention;

DETAILED DESCRIPTION OF PREFERRED EMBODIMENTS

Figure 1:
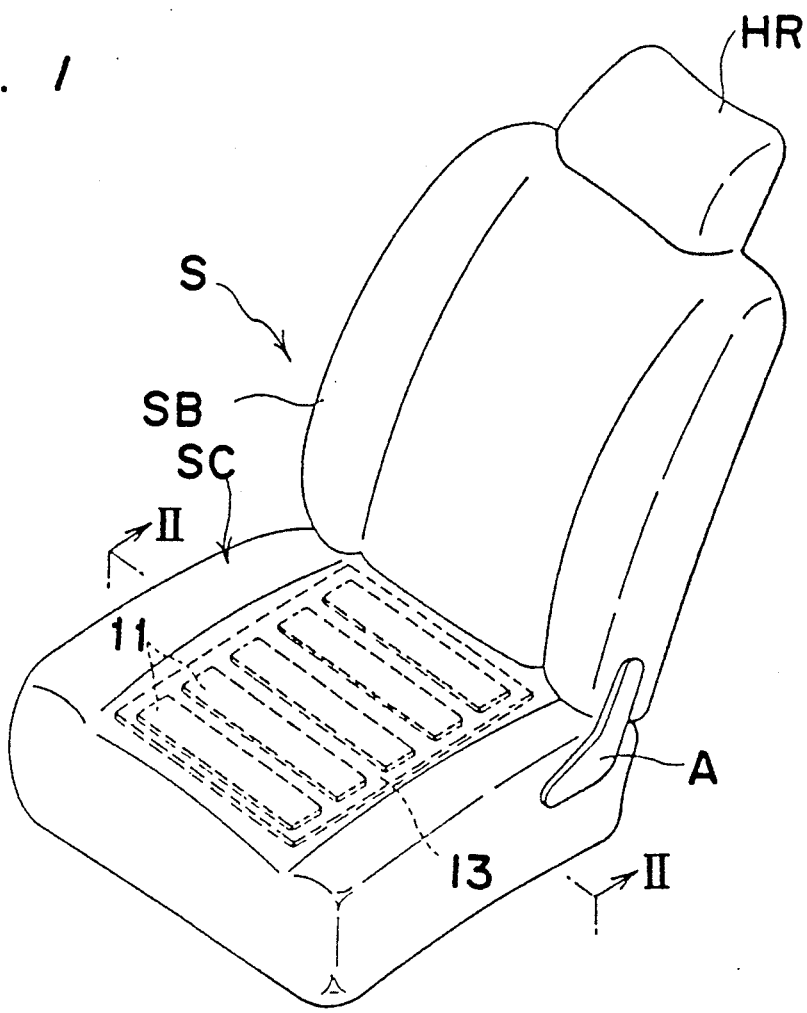
FIG. 1 is a schematic perspective view of an automobile seat assembly of the bucket type according to a first preferred embodiment of the present invention.

Before the description of the present invention proceeds, it is to be noted that like parts are designated by like reference numerals throughout the accompanying drawings.

Referring first to FIG. 1, there is shown in a perspective representation an automobile seat assembly S of the bucket type which generally comprises a generally rectangular seat cushion subassembly SC and a generally rectangular backrest subassembly SB having a headrest HR mounted atop the backrest subassembly SB and also having a lower end hingedly coupled through a pair of connecting angle members A to a rear end of the seat cushion subassembly SC in any well known manner so as to provide the seat assembly S as a whole with a generally L-shaped configuration. The seat assembly S to which the present invention is applicable may have any known tilt adjustment structure (not shown) designed and adapted to be operated by a seat occupant for adjusting the tilt of the backrest subassembly SB.

Figure 2:
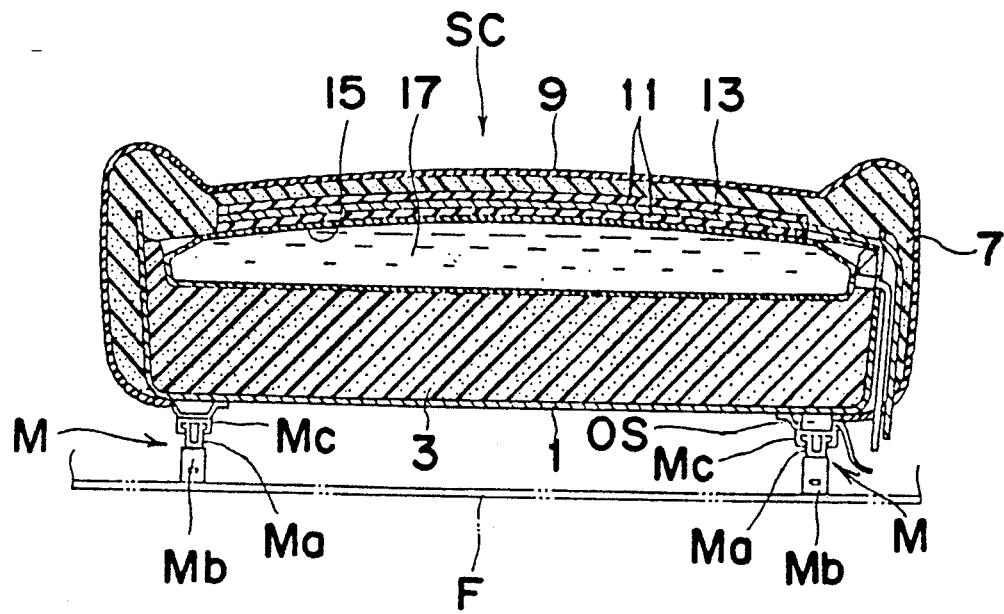
FIG. 2 is a cross-sectional view, on an enlarged scale, taken along the line II—II in FIG. 1.

The seat assembly S including the seat subassemblies SC and SB is, as best shown in FIG. 2, mounted on a vehicle boot floor F through a telescopic slide mechanism M comprising parallel guide rails Ma rigidly mounted on the floor F through respective brackets Mb so as to extend in a direction parallel to the longitudinal sense of an automobile body structure (not shown), generally U-sectioned parallel slide bars Mc rigidly secured from below to the bottom of the seat cushion subassembly SC and mounted on the associated guide rails Ma for telescopic movement relative to the guide rails Ma. The telescopic slide mechanism M includes a releasable lock mechanism for repositioning the seat assembly S relative to the steering wheel (not shown) to any desired one of a plurality of positions and for locking the seat assembly S at the selected position. As a matter of course, however, the seat assembly S may be immovably mounted on the boot floor F with no telescopic slide mechanism used.

Referring now to FIG. 2 which illustrates a cross-section of the seat cushion subassembly SC taken along the line II—II in FIG. 1, the seat cushion subassembly SC in accordance with a preferred embodiment of the present invention comprises a generally cup-shaped bottom support 1 mounted on the guide rails Ma through the respective slide bars Mc secured thereto. The seat cushion subassembly SC also comprises a lower cushioning layer 3 filled in the cup-shaped bottom support 1, an upper cushioning layer 5 (see FIG. 5) overlaying the lower cushioning layer 3 and a side cushioning layer 7 encircling the circumference of the seat cushion subassembly SC and continued at its upper edge to the perimeter of the upper cushioning layer 5. Each of these cushioning layers 3, 5 and 7 may be made of, for example, expanded polyurethane. Except for a exterior bottom surface of the cup-shaped bottom support 1, the assembly including the cup-shaped bottom support 1 and the various cushioning layers 3, 5 and 7 is substantially completely enclosed by a seat covering 9 made of, for example, a sheet of synthetic resin.

Positioned and embedded between the lower and upper cushioning layers 3 and 5 are upper and lower groups of generally rectangular shape memory slabs 11, the slabs of each group being spaced an equal distance from each other. The upper and lower groups of the shape memory slabs 11 are positioned immediately above and below, and are held in contact with opposite surfaces of, a generally rectangular flexible planar heater 13 which is also positioned and embedded between the lower and upper cushioning layers 3 and 5.

Each of the shape memory slabs 11 of any one of the upper and lower groups is made of elastic synthetic resin of a type which will exhibit a property similar to a rubber material having a predetermined elasticity at room temperature, but can be softened to deform to any desired shape, when it is heated by the planar heater 13 to a predetermined temperature, for example, 40° C. or higher, and can retain the deformed shape when it is cooled down to room temperature with the planar heater 13 deenergized.

Also embedded in the seat cushion subassembly SC and positioned between the lower cushioning layer 3 and the lower group of the shape memory slabs 11 is a generally rectangular sealed bag 15 having a quantity of liquid 17 filled therein, the function of which will become clear from the subsequent description.

Figure 3:
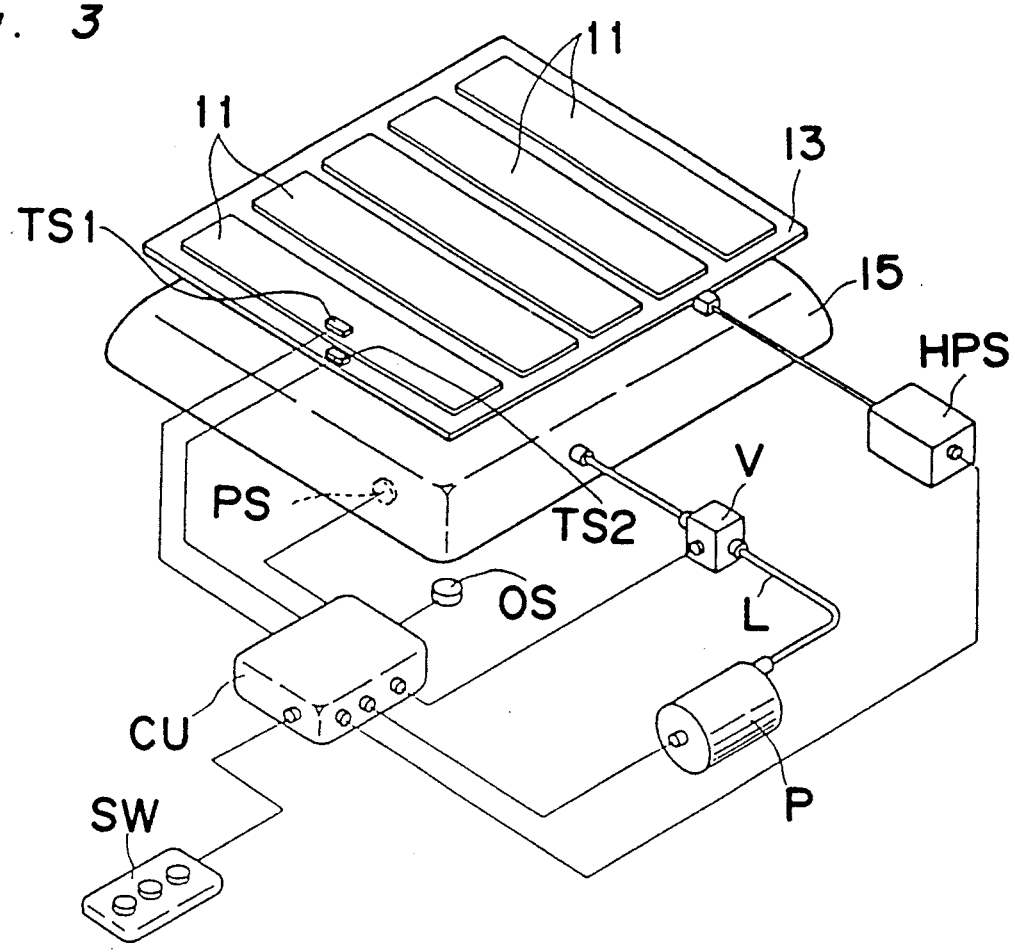
FIG. 3 is a perspective view showing a control system for controlling a cushioning bag and a planar heater for shape memory slabs used in the seat assembly according the first embodiment of the present invention.

The seat assembly S according to the present invention also comprises, as best shown in FIG. 3, an occupation sensor OS for detecting, and outputting a signal indicative of, a parameter descriptive of the occupation of the seat assembly S by a seat occupant, that is, the actual sitting of the seat occupant on the seat assembly S; first and second temperature sensors TS1 and TS2 for detecting, and outputting respective signals indicative of, the temperature of a representative one of the shape memory slabs 11 of the upper group and the temperature of the planar heater 13; and a pressure sensor PS for detecting, and outputting a signal indicative of, the pressure of the liquid 17 within the bag 15.

In particular, the parameter detected by the occupation sensor OS may include a change in load imposed by a passenger or driver on the seat cushion subassembly SC when the passenger or driver actually is seated on the seat assembly S, a vehicle speed which occurs after a driver having occupied the seat assembly S has driven the automobile and therefore signifies the presence of the driver actually occupying the seat assembly, a driver occupying the seat assembly S, or the start of an automobile power plant which takes place after a driver seated on the seat assembly S has turned on an automobile ignition switch and therefore signifies the presence of the driver actually occupying the seat assembly S. In view of this, the occupation sensor OS which can be employed in the practice of the present invention may be one or a combination of a load sensor for detecting a change in load on the seat assembly S, a vehicle speed sensor for detecting the vehicle speed having attained a predetermined speed and a switch sensor for detecting an ON state of the automobile ignition switch.

However, as illustrated, an occupation sensor OS in the form of a load sensor is employed and is shown as installed beneath the bottom support 1 in FIG. 1 so that the change in load imposed on the seat cushion subassembly SC as a result of the seat occupant actually sitting on the seat assembly SC can be detected.

Both of the operation of the planar heater 13 and the amount of the liquid 17, that is, the pressure within the sealed bag 15, can be controlled by the following control system, which will subsequently be described, so as to permit the seat cushion subassembly SC as a whole to be configured to fit the anatomical shape of a lower part of the seat occupant including the glutea region and the dorsal femoral region.

With particular reference to FIG. 3, the control system includes a heater power source HPS electrically coupled with the planar heater 13 for supplying an electric power necessary to energize the planar heater 13, a reversible pump assembly P having a liquid reservoir built therein and fluid-coupled with the fluid bag 15 through a piping L, an electromagnetic switching valve assembly V disposed in the piping L for controlling the flow of the fluid through the piping L, and a control unit CU adapted to receive the respective output signals from the various sensors TS1, TS2, PS and OS and to provide respective control signals necessary to control the heater power source HPS, the pump assembly P and the valve assembly V in dependence on the respective outputs from the various sensors TS1, TS2, PS and OS. In order for the internal pressure of the sealed bag 15 to be adjusted according to the desire of the seat occupant, a hand-operated switch pad SW including a heater control switch and a valve control switch is also electrically connected with the control unit CU for enabling the seat occupant to control the flow (either inflow or outflow) of the liquid through the piping L and, also, the selective initiation and interruption of the supply of the electric power to the planar heater 13.

Figure 4:
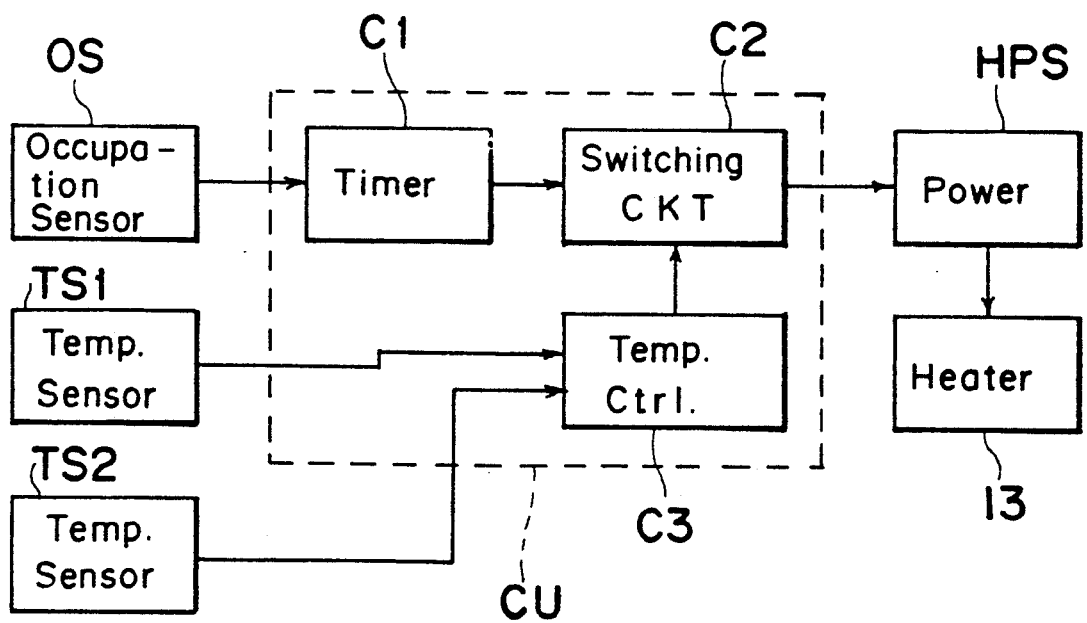
FIG. 4 is a circuit block diagram showing details of a control unit shown in FIG. 3.

The control of the planar heater 13 by the control unit CU will now be described with reference to a control circuit shown in FIG. 4. As shown in FIG. 4, the control unit CU comprises a timer circuit C1 operable in response to the load signal from the occupation sensor OS, a switching circuit C2 operable in response to a timer output signal from the timer circuit C1 for activating the heater power source HPS, and a temperature control C3 operable in response to the respective temperature signals from the first and second temperature sensors TS1 and TS2 for controlling the operation of the switching circuit C2.

With this control unit CU so designed, when the actual occupation of the seat assembly S, particularly the actual sitting on the seat cushion subassembly SC, by the seat occupant is detected by the occupation sensor OS, the timer circuit C1 can be operated in response to the load signal from the occupation sensor OS and provide the timer output signal after the passage of a predetermined time preset in the timer circuit C1. The timer output signal emerging from the timer circuit C1 is then supplied to the switching circuit C2 to activate the latter thereby to turn the heater power source HPS on to initiate the supply of the electric power to the planar heater 13. With this supply of the electric power, the planar heater 13 is energized to heat both groups of the shape memory slabs 11 to allow the latter to be softened to such an extent that the shape memory slabs 11 can be thermally deformed to a shape corresponding to the anatomical shape of the lower part of the seat occupant then sitting on the seat cushion subassembly SC. It is to be noted that the predetermined preset time of the timer circuit C1 may be chosen to be of a value required for the seat occupant occupying the seat assembly S to fix his or her posture on the seat cushion subassembly SC subsequent to the actual sitting on the seat cushion subassembly SC.

On the other hand, subsequent to the heating of the shape memory slabs 11 by the planar heater 13, the first and second temperature sensors TS1 and TS2 issue the respective temperature signals which are supplied to the temperature control C3 to activate the latter to control the operation of the switching circuit C2, that is, to control an operational condition of the heater power source HPS assumed in response to the output from the switching circuit C2.

The seat assembly S including the control system referred to above operates in the following manner. Assuming that an upper seat portion of the seat cushion subassembly SC generally above the liquid-filled bag 15 assumes such a shape as shown in FIG. 2 when and so long as no one sits on the seat cushion subassembly SC, that upper seat portion of the seat cushion subassembly SC would be downwardly depressed to follow a general contour of the lower body part of the seat occupant including the glutea region and the dorsal femoral region. Simultaneously with the actual sitting of the seat occupant on the seat assembly S, the occupation sensor OS generates the load signal which is in turn supplied to the timer circuit C1 of the control unit CU to activate the timer circuit C1 to allow the latter to start its counting operation. After the passage of the preset time counted by the timer circuit C1, that is, after the seat occupant has fixed his or her posture above the seat cushion subassembly SC, the timer circuit C1 triggers circuit C2 to operate the heater power source HPS on to permit the latter to initiate the supply of the electric power to the planar heater 13.

Figure 5:
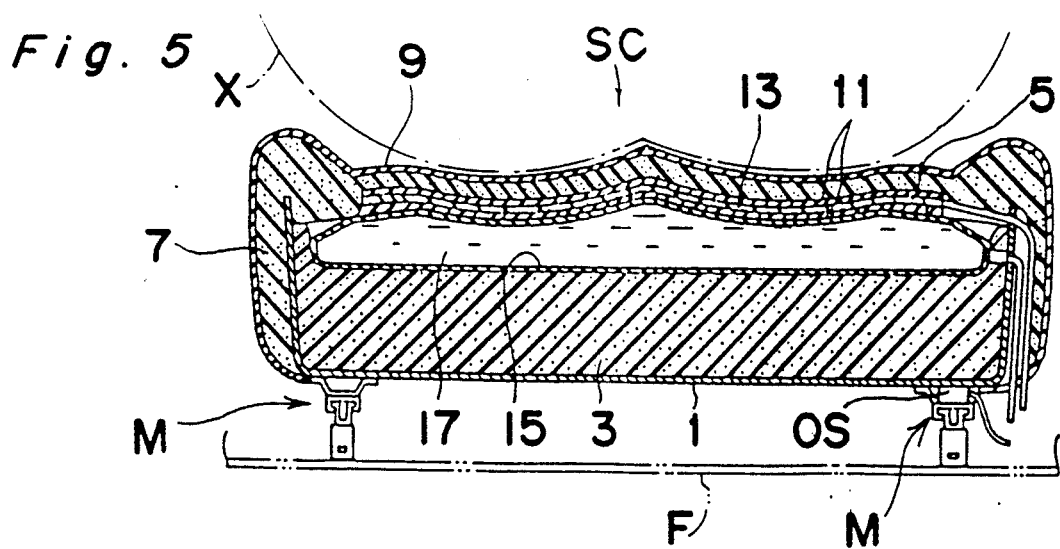
FIG. 5 is a view similar to FIG. 2, showing a seat cushion subassembly when and after a seat occupant has sat thereon.

Consequent upon the supply of the electric power to the planar heater 13 in the manner as hereinabove described, the upper and lower groups of the shape memory slabs 11 above and below the planar heater 13 are heated to soften. Upon the softening of the upper and lower groups of the shape memory slabs 11, the upper and lower groups of the shape memory slabs 11 are thermally deformed to a shape, as shown in FIG. 5, required for the upper seat portion of the seat cushion subassembly SC to follow substantially exactly the anatomical shape, indicated by X, of the lower body part of the seat occupant. When the supply of the electric power from the heater power source HPS to the planar heater 13 is subsequently interrupted with the upper and lower groups of the shape memory slabs 11 having been so deformed, the shape memory slabs 11 start cooling down while retaining the shape to which they have been thermally deformed.

In such case, since the liquid-filled bag 15 is disposed beneath the assembly of the shape memory slabs 11 and the planar heater 13, an increase of the internal pressure of the bag 15 induced by the sitting of the seat occupant on the seat cushion subassembly SC is immediately detected by the pressure sensor PS which then outputs the pressure signal to the control unit CU. More specifically, in response to the output from the pressure sensor PS indicating that the internal pressure of the bag 15 has increased, the control unit CU activates both of the pump P and the switching valve assembly V so that a portion of the liquid 17 within the bag 15 can be withdrawn to accommodate the thermal deformation of the shape memory slabs 11 so that a substantially uniform pressure can act on the lower body part of the seat occupant from the seat cushion subassembly SC and, at the same time, the seat cushion subassembly SC can provide a comfortable holding to the lower body part of the seat occupant.

Also, should the seat occupant manipulate the switch pad SW to effect a switching of the valve assembly V and also to activate the pump P to either supply or withdrawn the liquid 17 relative to the bag 15, the internal pressure of the bag 15 can be adjusted to a value desired by the seat occupant to ensure a more comfortable occupancy of the seat assembly.

It is to be noted that, in the practice of the present invention, the use of the liquid-filled bag 15 and its associated parts such as the pump P and the valve assembly V is not always essential and may be dispensed with if desired. Also, regardless of the presence or absence of the liquid-filled bag 15, one of the upper and lower groups of the shape memory slabs 11 may be dispensed with if desired.

Figure 6:
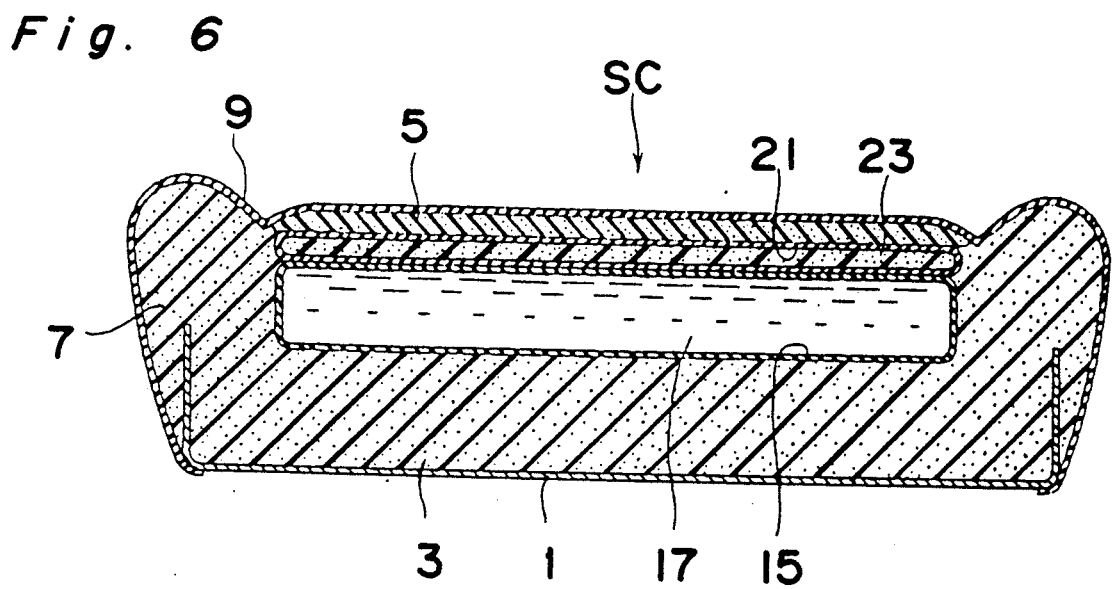
FIG. 6 is a view similar to FIG. 2, showing a second preferred embodiment of the present invention.
Figure 8:
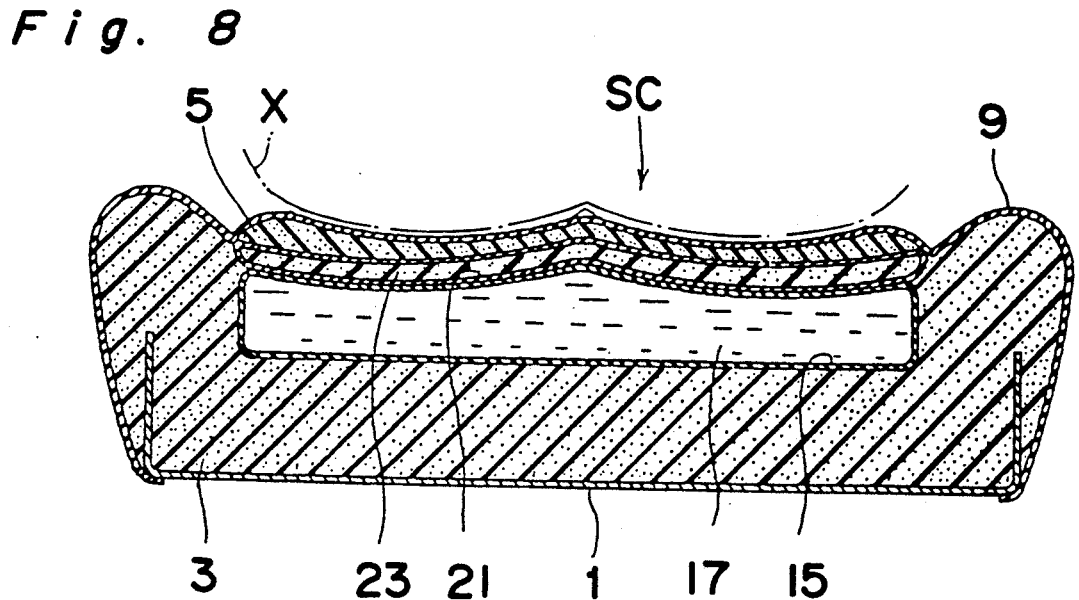
FIG. 8 is a view similar to FIG. 5, showing the seat cushion subassembly according to the second embodiment of the present invention when and after the seat occupant has sat thereon.
Figure 7:
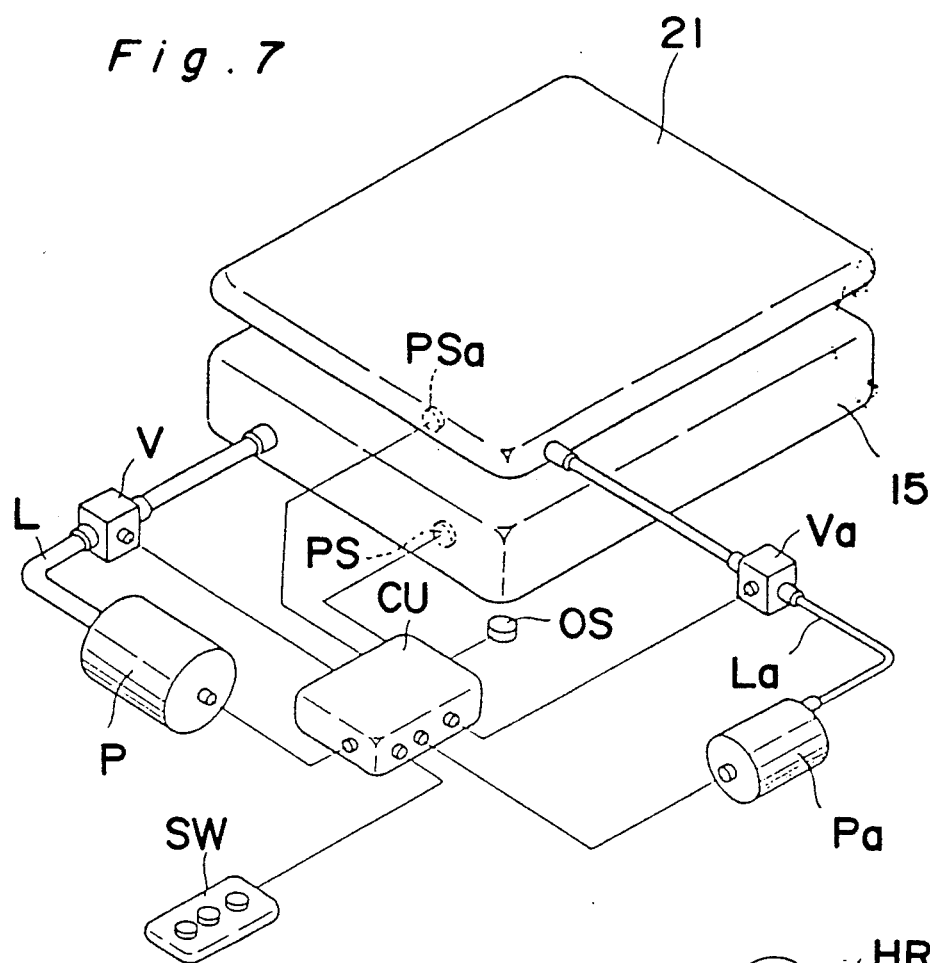
FIG. 7 is a view similar to FIG. 3, showing a control system used in the second embodiment of the present invention.

FIGS. 6 to 8 illustrate another preferred embodiment of the present invention, reference to which will now be made. It is, however, to be noted that, although in the foregoing embodiment particularly shown in FIGS. 2 and 5 the upper cushioning layer 5 has been shown as integrated with the side cushioning layer 7, the upper cushioning layer 5 in the embodiment of FIGS. 6 to 8 is separate from the side cushioning layer 7 which is integrated with the lower cushioning layer 3.

In the embodiment shown in FIGS. 6 to 8, instead of the combination of the planar heater and the upper and lower groups of the shape memory slabs which have been employed in the previously described embodiment, a cushioning bag 21 containing therein a mass of minute particles 23 of synthetic resin and a quantity of gas such as air is employed and disposed within the seat cushion subassembly SC and generally intermediate between the upper cushioning layer 5 and the liquid-filled bag 15. As best shown in FIG. 7, the cushioning bag 21 is communicated with a vacuum pump Pa through a piping La having an electromagnetic pneumatic valve assembly Va disposed therein, said valve assembly Va being capable of operating in a manner substantially identical with the operation of the electromagnetic liquid switching valve assembly V used in the foregoing embodiment of FIGS. 1 to 5.

The cushioning bag 21 may be said to have a shape memory capability. More specifically, this cushioning bag 21 is so designed that, when a load is imposed thereon through the upper cushioning layer 5 such as occasioned by the sitting of the seat occupant on the seat assembly S, the minute particles 23 filled in the cushioning bag 21 can move freely within the cushioning bag 21 to accommodate a deformation of the upper cushioning layer 5 that takes place incident to the placement of the lower body part of the seat occupant on the seat cushioning subassembly SC and the gas or air within the cushioning bag 21 can be subsequently withdrawn from the cushioning bag 21 to retain the minute particles 23 in the positions to which they have moved to accommodate such deformation.

The cushioning bag 21 has a pressure sensor PSa installed therein for detecting the internal pressure of the cushioning bag 21, which sensor PSa can provide a pressure signal indicative of the internal pressure of the cushioning bag 21 to the control unit CU.

The control system shown in FIG. 7 is substantially similar to that shown in FIG. 3, except that the first and second temperature sensors TS1 and TS2 and the heater power source HPS both used in the system of FIG. 3 are dispensed with and, instead, the pressure sensor PSa, the vacuum pump Pa, and the pneumatic valve assembly Va are electrically connected with the control unit CU. This control system according to the second preferred embodiment of the present invention is so designed and so systematized that, when the load signal from the occupation sensor OS and the respective pressure signals from the pressure sensors PS and PSa are input to the control unit CU, the control unit CU can provide respective control signals to the pumps P and Pa and the valve assemblies V and Va to control the respective operation of the pumps P and Pa and the valve assemblies V and Va in a manner substantially similar to that accomplished by the control system of FIG. 3. As is the case with the control system of FIG. 3, the manipulable switch pad SW is coupled with the control unit CU so that the seat occupant can adjust the internal pressure of both the liquid-filled bag 15 and the cushioning bag 21 to desired values.

According to the second preferred embodiment, assuming that an upper seat portion of the seat cushion subassembly SC generally above the liquid-filled bag 15 and including the cushioning bag 21 assumes such a shape as shown in FIG. 6 when and so long as no one sits on the seat SC. When an occupant sits on the seat assembly, then the upper cushion subassembly seat portion of the seat cushion subassembly SC will be downwardly depressed to follow a general contour of the lower body part of the seat occupant including the glutea region and the dorsal femoral region and, at the same time, the minute particles 23 within the cushioning bag 21 will be freely driven within the cushioning bag 21 to accommodate the deformation of the upper cushioning layer 5. Simultaneously with the actual sitting of the seat occupant on the seat assembly S, the occupation sensor OS generates the load signal which is in turn supplied to the control unit CU. The control unit CU then issues the control signals t the valve assembly Va and the vacuum pump Pa to activate the latter so that the air within the cushioning bag 21 can be drawn outside the cushioning bag sufficiently to set the minute particles 23 within the cushioning bag 21 in position immovable within the bag 21 and accommodating the deformation of the upper cushioning layer 5 as hereinbefore described.

In such case, since the liquid-filled bag 15 is disposed beneath the cushioning bag 21, an increase of the internal pressure of the bag 15 induced by the seat occupant sitting on the seat cushion subassembly SC is immediately detected by the pressure sensor PS which then outputs the pressure signal to the control unit CU. More specifically, in response to the output from the pressure sensor PS indicating the increase of the internal pressure of the bag 15, the control unit CU activates both of the pump P and the switching valve assembly V so that a portion of the liquid 17 within the bag 15 can be withdrawn to the outside of the bag 15 to accommodate the deformation of the cushioning bag 21 which is induced by the actual sitting of the seat occupant on the seat cushioning subassembly SC, as shown in FIG. 8, so that a substantially uniform pressure can act on the lower body part of the seat occupant from the seat cushion subassembly SC. At the same time, the seat cushion subassembly SC can provide a comfortable support to the lower body part of the seat occupant.

Also, should the seat occupant manipulate the manipulable switch pad SW, the internal pressure of the bag 15 can be adjusted to a value desired by the seat occupant to ensure a more comfortable sitting.

In the practice of the second preferred embodiment of the present invention shown in and described with reference to FIGS. 6 to 8, the use of the liquid-filled bag 15 and its associated parts is not always essential and may therefore be dispensed with as is the case with the first preferred embodiment of the present invention shown in and described with reference to FIGS. 1 to 5.

A third preferred embodiment of the present invention is shown in FIGS. 9 to 14, reference to which will now be made.

Figure 9:
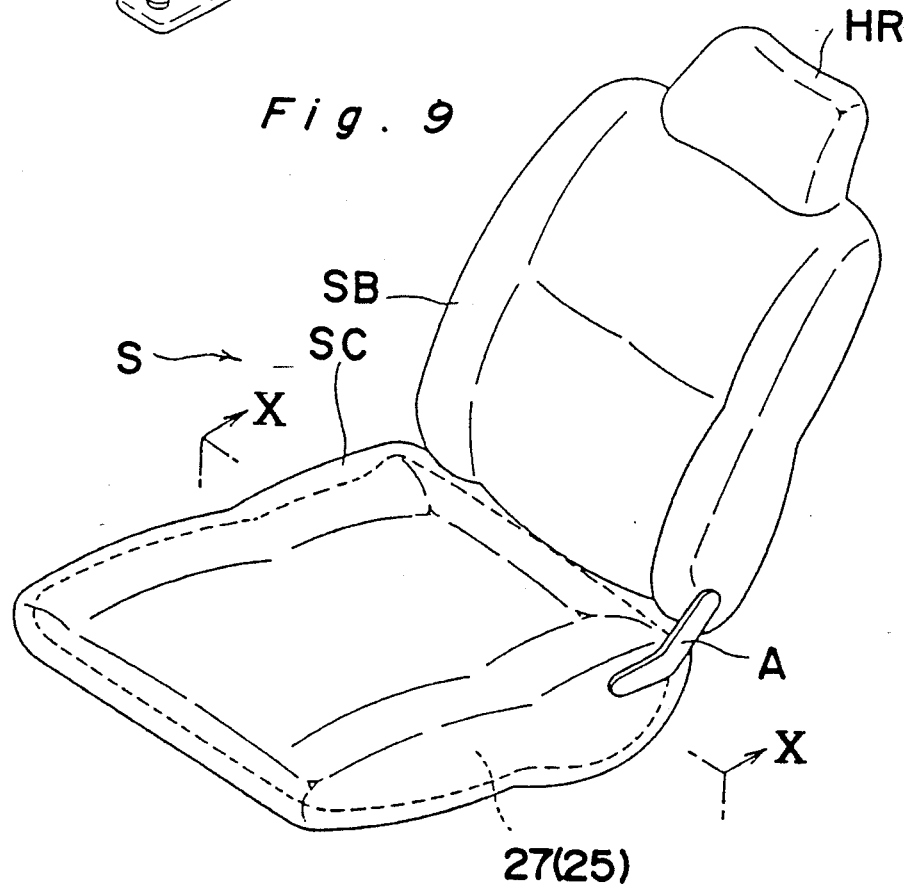
FIG. 9 is a perspective view of an automobile seat assembly according to a third preferred embodiment of the present invention.

As is the case with the seat assembly S shown in FIG. 1, the seat assembly S shown in FIG. 9 generally comprises the generally rectangular seat cushion subassembly SC and the generally rectangular backrest subassembly SB having the headrest HR mounted atop the backrest subassembly SB and also having a lower end hingedly coupled through the paired connecting angle members A to a rear end of the seat cushion subassembly SC in any well known manner so as to provide the seat assembly S as a whole to be a generally L-shaped configuration. This seat assembly S may be mounted on the automobile floor in a manner similar to that shown in and described with reference to FIG. 1.

Figure 10:
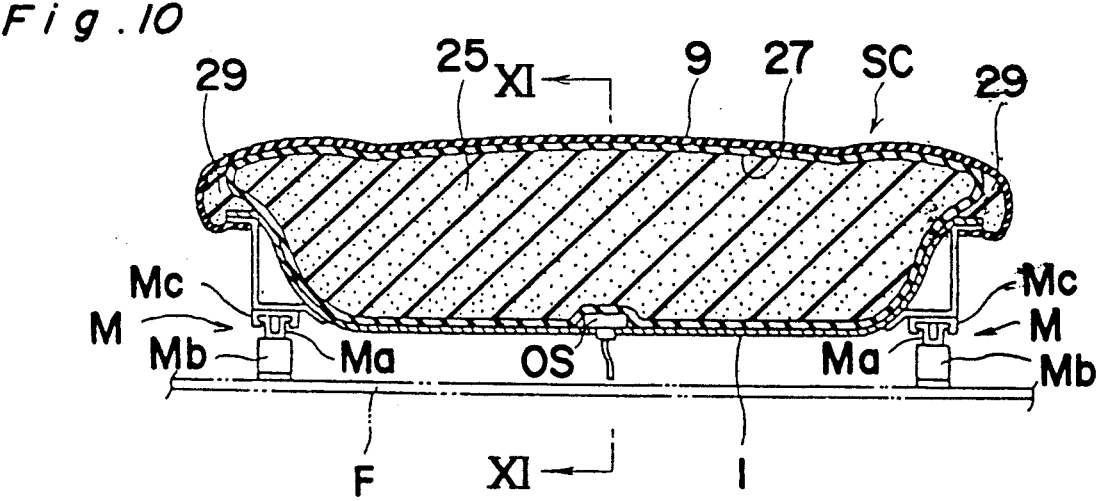
FIG. 10 is a cross-sectional view, on an enlarged scale, taken along the line X—X in FIG. 9.
Figure 11:
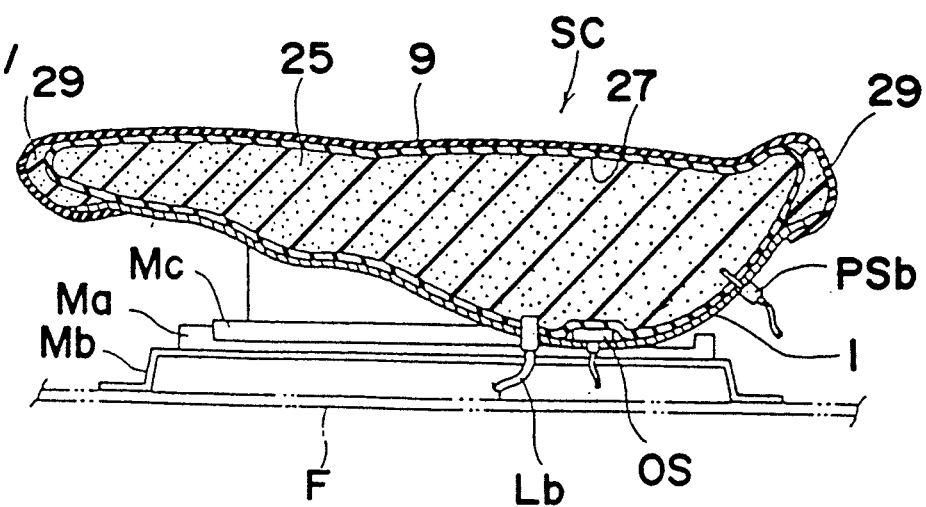
FIG. 11 is a cross-sectional view taken along the line XI—XI in FIG. 10.

However, unlike the seat cushioning subassembly SC employed in the previous embodiments of the present invention, the seat cushioning subassembly SC shown in FIG. 9 and the subsequent drawings employs a single cushioning layer 25 having a substantial thickness and made of open-celled expanded elastomer such as, for example, expanded polyurethane having an open-celled structure in which foams are communicated with each other. As best shown in FIGS. 10 and 11, the cushioning layer 25 is enclosed within a gas-tight bag 27 made of a rubber material and having a volume generally equal to or slightly smaller than the volume of the cushioning layer 25 in an uncompressed state. The gas-tight bag 27 enclosing the cushioning layer 25 is immovably received in the generally cup-shaped bottom support 1, and a peripheral edge portion (front rear and side edge regions) of the seat cushion subassembly SC which is situated outwardly above the cup-shaped bottom support 1 is protected and reinforced by a foamed trim member 29 which may be made of expanded polyurethane.

The trim member 29 surrounding the peripheral edge portion of the seat cushion subassembly SC and a generally flat upper surface of the rubber bag 27 enclosing the cushioning layer 25 are substantially completely covered and protected by the seat covering 9 which may be made of synthetic resin.

Figure 12:
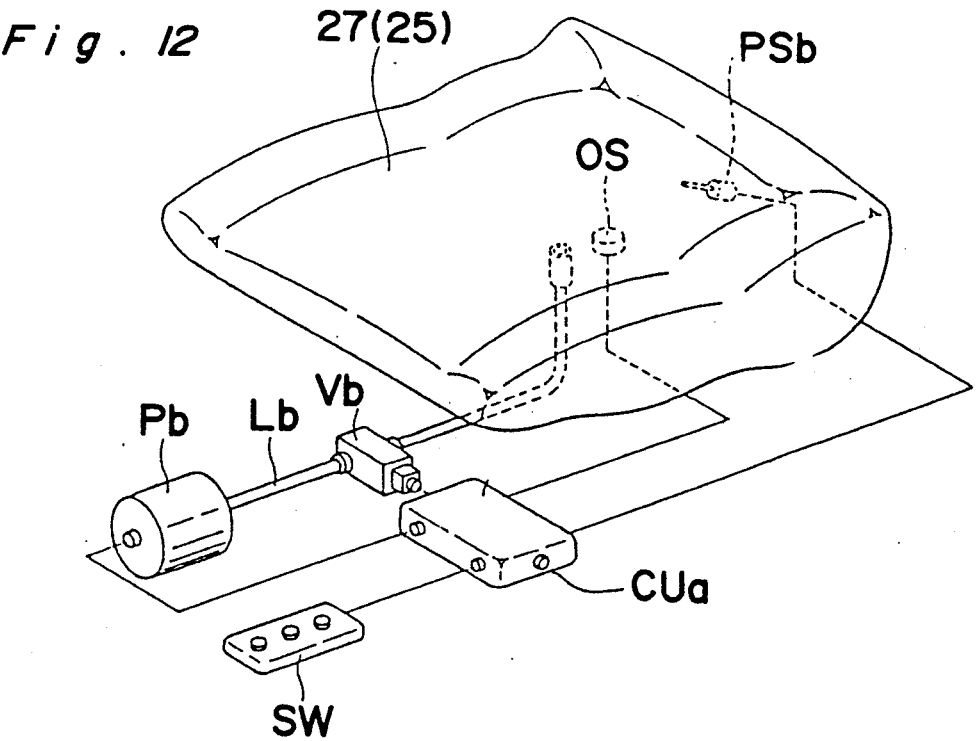
FIG. 12 is a perspective view showing a control system used in connection with the third embodiment of the present invention.

The interior of the rubber bag 27 is fluid-coupled with a vacuum pump Pb through a piping Lb having an electromagnetic switching valve assembly Vb disposed therein as shown in FIG. 12. FIG. 12 also shows that, as is the case with any one of the foregoing embodiments, the seat cushion subassembly SC includes the occupation sensor OS in the form of the load sensor disposed between the bottom of the rubber bag 27 and the bottom support 1, and a pressure sensor PSb for detecting, and generating an output signal indicative of, a change in internal pressure inside the rubber bag 27, all of the vacuum pump Pb, the valve assembly Vb and the sensors OS and PSb being electrically connected with a control unit CUa shown in FIG. 12.

The control unit CUa used in the third preferred embodiment of the present invention includes a pressure adjusting circuit C4 in addition to the timer circuit C1 and the switching circuit C2 as best shown in FIG. 13. The load signal from the occupation sensor OS is supplied to the timer circuit C1 and the pressure signal from the pressure sensor PSb is supplied to the pressure adjusting circuit C4. This control unit CUa is so designed as to issue respective control signals to the vacuum pump Pb and the switching valve assembly Vb to control them in dependence on the signals input thereto from the associated sensors OS and PSb. It is to be noted that, as is the case with any one of the foregoing embodiments, the control system shown in FIG. 12 is provided with the switch pad SW so that the seat occupant can adjust the internal pressure of the rubber bag 27 to a desired value and can also bring the switching valve assembly Vb in position to communicate the interior of the rubber bag 17 to the atmosphere as desired.

The seat assembly S according to the third preferred embodiment of the present invention operates in the following manner. Assuming that the valve assembly Vb is in position to communicate the interior of the rubber bag 27, that is substantially completely filled with the cushioning layer 25, with the vacuum pump Pb, and if a seat occupant is subsequently seated on the seat cushion subassembly SC, the occupation sensor OS detects the change in load imposed on the seat cushion subassembly SC and issues the load signal to the timer circuit C1 to activate the later. After the passage of the preset time set in the timer circuit C1, the timer circuit C1 generates an output signal with which the switching circuit C2 is activated to drive the vacuum pump Pb so that air contained within the rubber bag 27 can be discharged by the vacuum pump Pb to the outside of the rubber bag 27.

It is to be noted that, when the air within the rubber bag 27 is discharged to the outside, the rubber bag 27 will be immediately deflated, however, the presence of the cushioning layer 25 within the rubber bag 27 permits the rubber bag 27 to retain its shape. Accordingly, as the air within the rubber bag 27 is discharged upon the activation of the vacuum pump Pb while the seat occupant is seated on the seat cushion subassembly SC, an upper portion of the cushioning layer 25 adjacent the lower body part of the seat occupant is progressively depressed to assume a shape generally similar to the anatomical shape of the lower body part of the seat occupant as shown by X in FIG. 14. In particular, regions of the upper portion of the cushioning layer 25 corresponding to ischial tuberosities in the lower body part of the seat occupant are, as clearly shown in FIG. 14, depressed deeper than the remaining region of the same upper portion of the cushioning layer 25.

Once the condition shown in FIG. 14 is established, the pressure sensor PSb generates a pressure signal indicative of the internal pressure of the rubber bag 27 having attained a predetermined reduced pressure, which pressure signal is supplied to the pressure adjusting circuit C4 to cause the switching circuit C2 to bring the vacuum pump Pb to a halt, wherefore the cushioning layer 25 is retained in a shape depressed sufficiently to permit the upper portion of the cushioning layer 25 to fit the anatomical shape of the lower body par of the seat occupant.

Thus, the cushioning system including the rubber bag 27 enclosing the cushioning layer 25 is in essence an air cushion and, therefore, can accommodate the load imposed thereon by the seat occupant to an extent that a substantially uniform pressure can act on the lower body part of the seat occupant from the seat cushion subassembly SC and, at the same time, the seat cushion subassembly SC can provide a comfortable support to the lower body part of the seat occupant.

Also, should the seat occupant manipulate the switch pad SW, the internal pressure of the bag 27 can be adjusted to a value desired by the seat occupant to ensure a more comfortable sitting.

It is to be noted that the provision of the circumferentially extending trim member 29 made of expanded polyurethane, preferably that of closed cellular structure, is effective to avoid any possible arbitrary deformation of the seat cushion subassembly SC as a whole and also to keep the seat covering 9 under taut conditions at all times regardless of the internal pressure of the rubber bag 27.

In the practice of the third preferred embodiment of the present invention shown in and described with reference to FIGS. 9 to 14, the arrangement may be made such that, when the occupation sensor OS generates the load signal, the control unit CUa can, in response to such load signal, instruct the automobile power plant to increase the engine speed and also to communicate the engine induction system with the switching valve Vb. In such case, a negative pressure developed in the engine induction system can be utilized to facilitate the discharge of air from the rubber bag 27 in cooperation of the vacuum pump Pb thereby to lessen the load imposed on the vacuum pump Pb.

It is also to be noted that the cushioning system in the embodiment of FIGS. 9 to 14 can restore to the original shape when the seat occupant leaves the seat assembly S, particularly from the seat cushion subassembly SC, at which time the switching valve Vb can be brought into a position to communicate the interior of the rubber bag 27 to the atmosphere. Separate pipings may be employed for the supply of air into and withdrawal of the air from the rubber bag 27, respectively, as shown in any one of FIGS. 15 and 17 which illustrate first and second modifications of the third preferred embodiment of the present invention.

Referring to first to FIG. 15, the piping for the withdrawal of air from the interior of the rubber bag 27 by the action of the vacuum pump Pb is identified by DL while the piping for the supply of air from the atmosphere into the interior of the rubber bag 27 to facilitate the restoration of the cushioning layer 25 to the original shape is identified by SL. The supply piping SL has an electromagnetic switching valve Vc adapted to be held in a closed position so long as the load signal from the occupation sensor OS is active, that is, so long as the seat occupant occupies the seat assembly S, but held in an opened position after the load signal becomes inactive, that is, after the seat occupant has left the seat assembly S. As illustrated, a downstream end of the supply piping SL with respect to the direction of flow towards the interior of the rubber bag 27 is branched into a plurality of branch passages SLa which are plugged into the rubber bag 27 in gas-tight fashion.

Thus, it will readily be understood that, when the interior of the rubber bag 27 is to be communicated with the atmosphere to permit the cushioning layer 25 then depressed to be restored to its original shape, a substantial quantity of air can flow into the rubber bag 27 through the switching valve Vc by way of the supply piping SL, advantageously shortening the length of time required for the cushioning layer 25 to be restored to its original shape as compared with the case in which a single piping is used for the alternate withdrawal and supply of air from and into the rubber bag 27.

To further facilitate the restoration of the cushioning layer 25 within the rubber bag 27, a free end portion of each of the branch passages SLa, which is situated inside the rubber bag 27, may have a multiplicity of perforations 31 as best shown in FIG. 16 on an enlarged scale.

Figure 17:
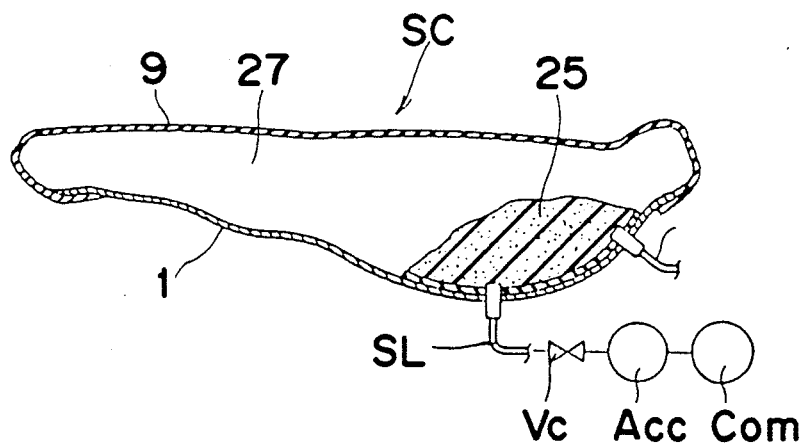

In the modification shown in FIG. 17, an upstream end of the supply piping SL shown in FIG. 15 is fluid-coupled with a compressor Com through an accumulator Acc disposed intermediate between the compressor Com and the switching valve Vc. According to this modification of FIG. 17, when the switching valve Vc is in position to communicate with the interior of the rubber bag 27, compressed air accumulated in the accumulator Acc can be substantially instantly supplied into the rubber bag 27 and, accordingly, the cushioning layer 25 then depressed can be immediately restored to its original shape.

When it is desired that the seat cushion subassembly SC used in the practice of the third preferred embodiment of the present invention to have a further improved cushioning property, numerous methods can be employed as shown in FIGS. 18 to 24, respectively.

Figure 18:
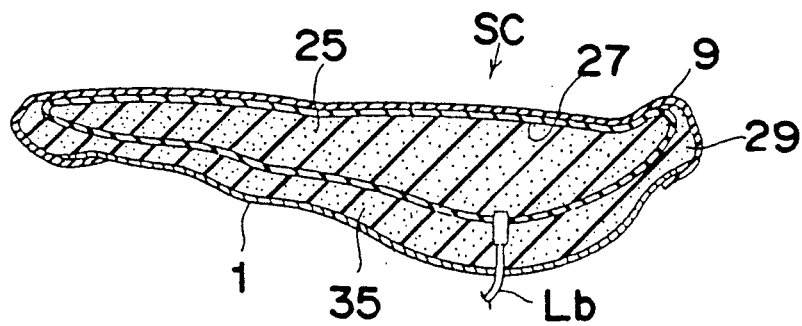

More specifically, according to the third embodiment shown in and described with reference to FIGS. 9 to 14, the rubber bag 27 completely enclosing the cushioning layer 25 of open-celled expanded polyurethane has been shown as directly mounted on the bottom support 1. However, as shown in FIG. 18 showing a third modification, an elastic underlining 35 made of expanded elastomer, preferably foamed polyurethane of closed cellular structure, may be laid beneath the rubber bag 27 and above the bottom support 1 so that, even when the internal pressure of the rubber bag 27 is reduced somewhat considerably, the cushioning property of the seat cushion subassembly SC will not be detrimentally impaired.

Also, according to the third embodiment of FIGS. 9 to 14, the rubber bag 27 has been shown as having a single chamber containing the cushioning layer 25 of a volume generally equal to or slightly greater than the volume of the rubber bag 27 in an inflated condition. However, in a fourth modification of the third embodiment of the present invention shown in FIG. 19, the interior of the rubber bag 27 is divided by an elastic partition 27a, integral with the rubber bag 27, into upper and lower chambers in which respective cushioning layers 25a and 25b are enclosed. While the lower chamber of the rubber bag 27 enclosing the cushioning layer 25b is fluid-coupled with the previously discussed piping Lb, the upper chamber of the rubber bag 27 enclosing the cushioning layer 25a is fluid-coupled with a piping Lc for the selective supply and withdrawal of air therethrough to and from the upper chamber of the rubber bag 27.

Preferably, the upper cushioning layer 25a within the upper chamber of the rubber bag 27 is of an elasticity higher than that of the lower cushioning layer 25b within the lower chamber of the rubber bag 27.

Figure 19:
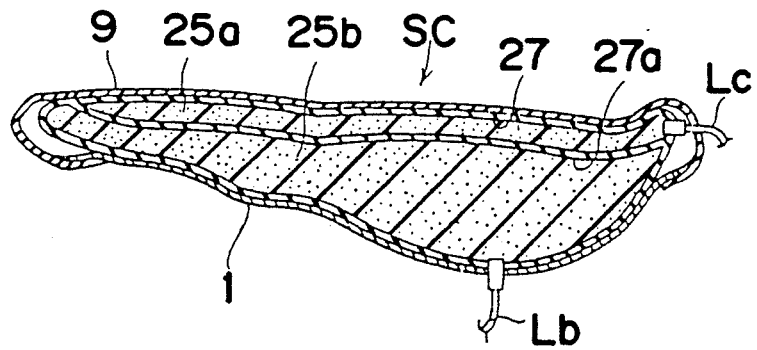

The seat cushion subassembly SC according to the modification shown in FIG. 19 is so designed that, after the seat occupant has become seated on the seat cushion subassembly SC, air within the upper and lower chambers of the rubber bag 27 are withdrawn through the respective pipings Lc and Lb to reduce the respective internal pressures within the upper and lower chambers to permit the upper portion of the seat cushion subassembly SC to be depressed to a shape generally conforming to the anatomical shape of the lower body part of the seat occupant. Thereafter, only the upper chamber of the rubber bag 27 is communicated to the atmosphere to accentuate the cushioning property of the seat cushion subassembly SC as a whole.

Figure 20:
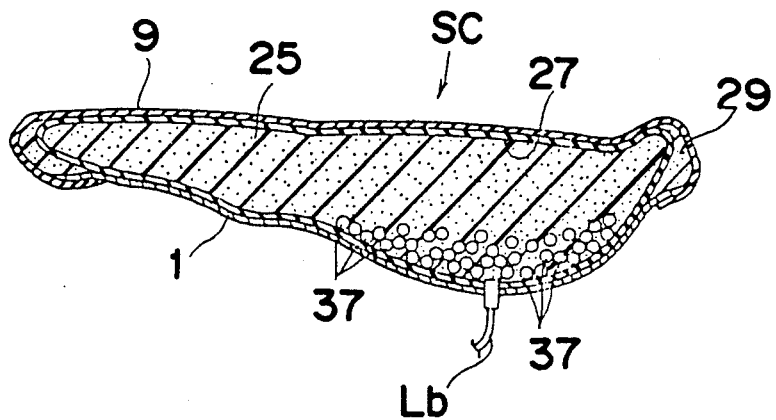

In a fifth modification of the third preferred embodiment of the present invention shown in FIG. 20, a plurality of closed, gas-filled balls 37 made of rubber material are distributed within the rubber bag 27 and held fixedly in position in a bottom region of the cushioning layer 25 adjacent the bottom support 1. This type of cushioning system can be manufactured, for example, by preparing a rubber bag, filling an expandable polyurethane in a fluid state into the rubber bag together with gas-filled balls, and heating the system to allow the polyurethane to expand to form the cushioning layer 25. However, the details of the method of making the cushioning system of FIG. 20 are not the subject matter of the present invention and are not therefore discussed herein for the sake of brevity.

According to the modification shown in and described with reference to FIG. 20, a favorable cushioning property can be obtained by the presence of the gas-filled balls 37.

The gas-filled balls 37 may, as shown in FIG. 21 showing a sixth modification of the third embodiment of the present invention, be distributed within the rubber bag 27 and held fixedly in position in a top region of the cushioning layer 25 remote from the bottom support 1.

In a seventh modification shown in FIGS. 22 and 3, the bottom region of the cushioning layer 25 enclosed in the rubber bag 27 is formed with a plurality of generally circular-sectioned and equally spaced recesses 25c in a predetermined pattern, each of said recesses 25c extending inwardly of the cushioning layer 25 from a bottom surface thereof adjacent the bottom support 1. In correspondence with the pattern of the recesses 25c, that portion of the rubber bag 27 generally aligned with the pattern of the recesses 25c is formed with generally cylindrical projections 27c protruding inwardly of the rubber bag 27 and snugly into respective recesses 25c in the cushioning layer 25.

Since the position of the patterned recesses 25c in the cushioning layer 25 corresponds to that portion of the seat cushion subassembly which will align generally with the ischial tuberosities of the lower body part of the seat occupant, comfortable cushioning can be obtained. In addition, the patterned recesses 25c and the corresponding hollows in the projections 27c in the rubber bag 27 can serve as a buffer for effectively minimizing any possible transmission of vibrations, induced in the automobile body structure during the running of the automobile, to the seat occupant sitting on the seat cushion subassembly SC.

It is to be noted that each of the recesses 25c need not be of a generally cylindrical shape as shown, but may be of any sectional shape. A similar description applies to the shape of the corresponding projections 27c in the rubber bag 27.

In the eighth modification shown in FIG. 24, a leaf spring assembly 39 of predetermined configuration is disposed between the bottom support 1 and a bottom region of the rubber bag 27 with the cushioning layer 25 therein and at a location which would align with the ischial tuberosities of the lower body part of the seat occupant. Since the leaf spring assembly 39 itself can provide a spring action, the cushioning property of the seat cushion sub-assembly SC can be effectively enhanced.

In any one of the first and second embodiments of the present invention, at least an upper portion of the seat covering 9 has been shown as laid over the rubber bag 27. In practice, for avoiding any possible displacement of that upper portion of the seat covering 9 relative to the rubber bag 27, various fastening methods are employed to secure such upper portion of the seat covering 9 to the rubber bag 27, examples of which are shown in FIG. 25 and FIGS. 26 and 27.

Figure 25:
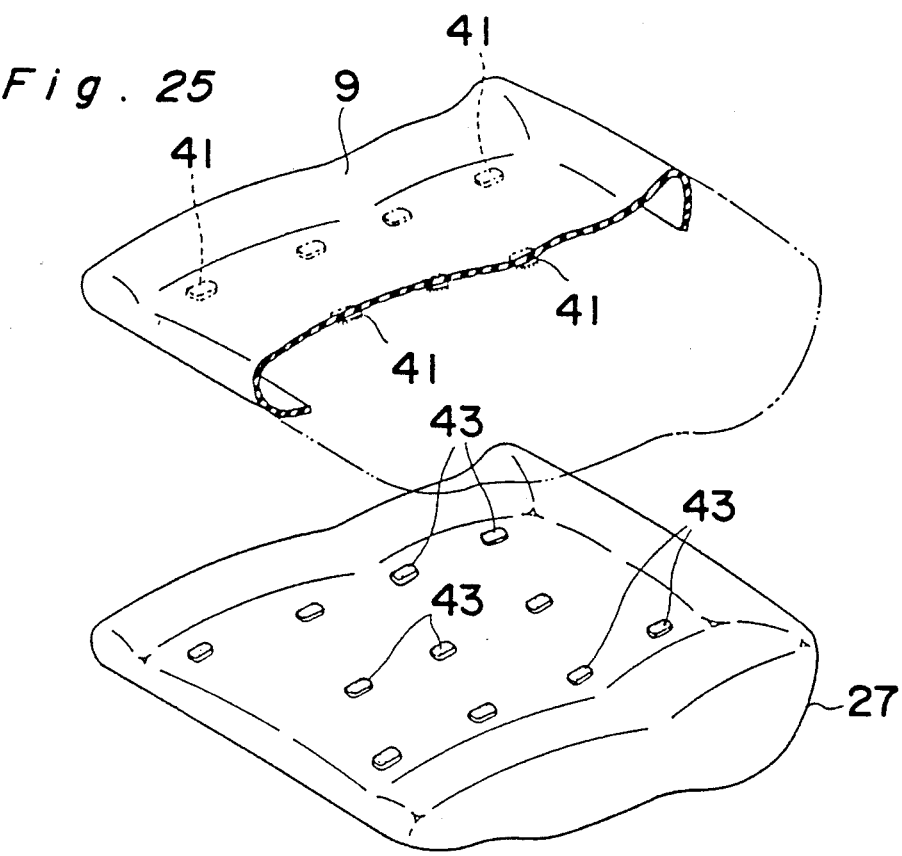
FIGS. 25 and 26 are schematic perspective views of the seat cushion subassembly showing different methods of securing a seat covering to the seat cushion subassembly, respectively.

Referring first to FIG. 25, the upper portion of the seat covering 9 has an inner surface confronting the rubber bag 27 and having a plurality of hook tapes 41 secured to such inner surface thereof in a predetermined pattern. On the other hand, an upper portion of the rubber bag 27 corresponding in position to such upper portion of the seat covering 9 has a corresponding number of loop tapes 43 secured thereto for releasable engagement with the associated hook tapes 41. The combination of the hook and loop tapes may be a commercially available fastening tape structure sold under the trademark "Velcro".

It is to be noted that the hook tapes 41 shown as secured to the seat covering 9 and the loop tapes 43 shown as secured to the rubber bag 27 may be reversed in position with respect to each other.

Figure 27:
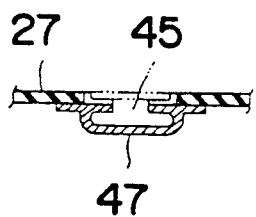
FIG. 27 is a cross-sectional view, on an enlarged scale, taken along the line XXVII—XXVII in FIG. 26.
Figure 26:
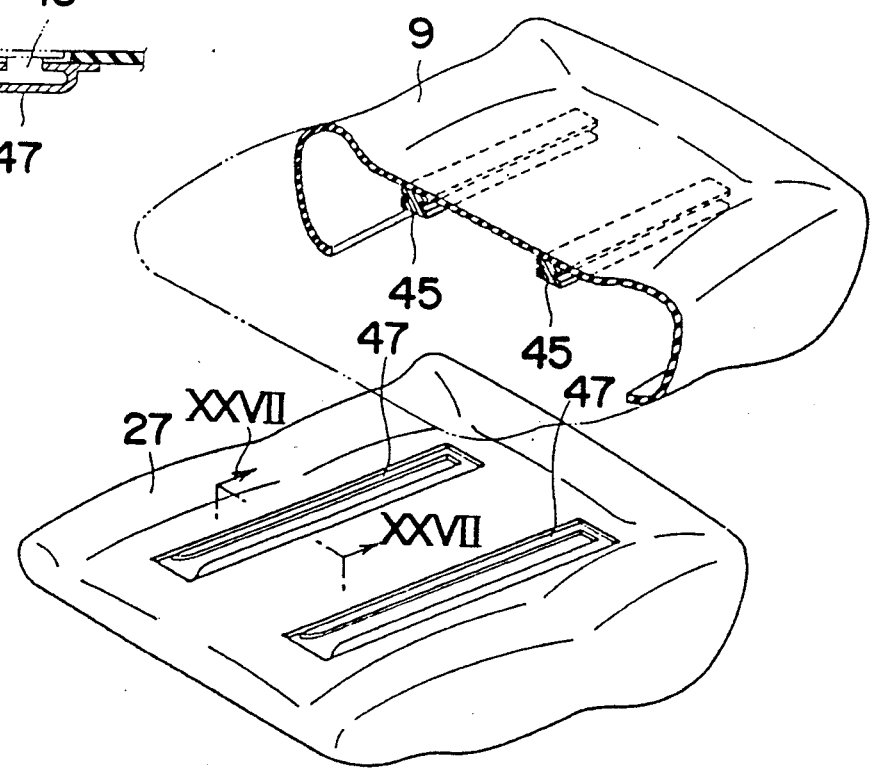

In the example shown in FIG. 26 and 27, a pair of generally elongated, generally H-sectioned flexible anchor members 45 are secured to the inner surface of the upper portion of the seat covering 9 while correspondingly elongated, generally C-sectioned flexible guide members 47 are secured to the upper surface of the rubber bag 27. The anchor members 45 are cooperable with the guide members 47 in a telescopically engageable fashion. Accordingly, when the anchor members 45 are aligned with the respective guide members 47 in end-to-end fashion and the seat covering 9 is then pulled from one side adjacent the rear end of the seat cushion assembly SC towards the opposite side while allowing the anchor members 45 to slide in the associated guide members 47 as best shown in FIG. 27 which illustrates, on an enlarged scale, a cross-section taken along the line XXVII—XXVII in FIG. 26, the seat covering 9 can be set in position above the rubber bag 27 enclosing the cushioning layer 25. Preferably, the anchor members 45 and the guide members 47 are secured to the seat covering 9 and the rubber bag 27, respectively, so as to extend in a direction conforming to the longitudinal sense of the automobile body structure.

For accelerating the restoration of the cushioning layer 25 back to the original shape after the seat occupant has left the seat assembly S, the modification shown in and described with reference to FIG. 15 employs a pneumatic circuit for supplying a forced draft of air into the cushioning bag 27 to inflate the bag 27 and also to bring the cushioning layer 25 quickly into an uncompressed state (in which cells of the cushioning layer 25 are filled with air). The accelerated restoration of the cushioning layer 25 back to the original shape may not be always essential in the practice of the present invention. However, a seat assembly having the seat cushion subassembly SC thereof left depressed is not aesthetically attractive. Accordingly, rendering the seat cushion subassembly SC aesthetically pleasing at any time immediately after the seat occupant has left the seat assembly S can be accomplished in numerous ways without employing such a somewhat complicated and expensive means. Some of these methods will now be described with particular reference to FIGS. 28 to 35.

Figure 28:
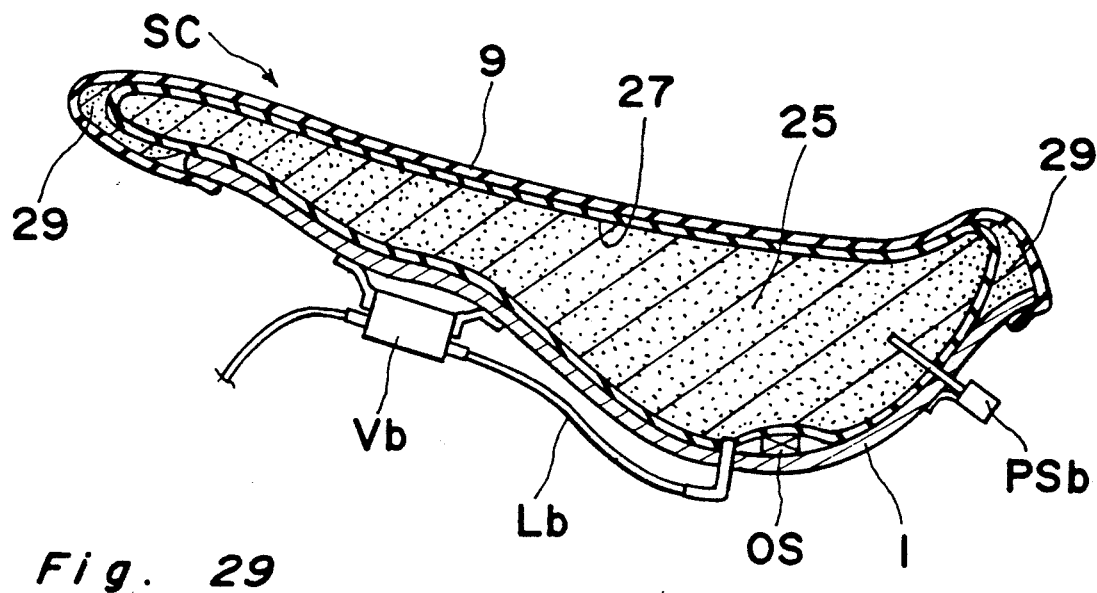
FIG. 28 is a side sectional view of the seat cushion subassembly according to a fourth preferred embodiment of the present invention.

The seat cushion subassembly SC shown in FIG. 28 is substantially identical in construction with that shown in and described with reference to FIGS. 10 to 14 except for the structure of the seat covering 9. It is to be noted that, in FIG. 28, the switching valve assembly Vb is shown as being rigidly secured from below to the bottom support 1 through a suitable valve housing. The idea of securing the valve assembly or assemblies and/or the vacuum pump or pumps to the bottom support can be applicable to any one of the foregoing embodiments, including the related modifications, of the present invention.

Figure 30:
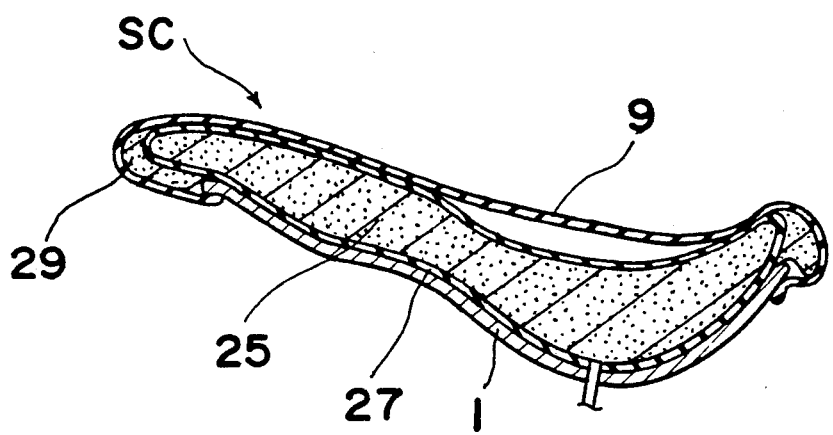
Figure 31:
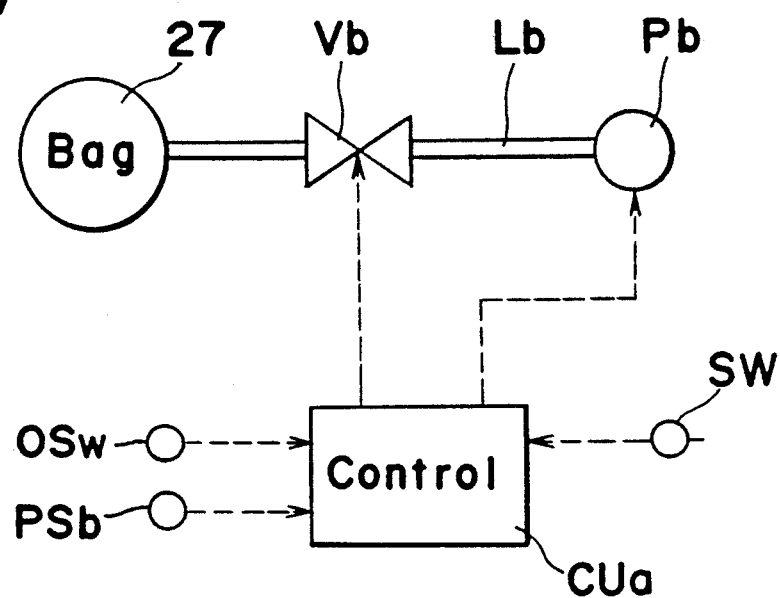
FIG. 31 is a diagram showing a fluid control circuit used in connection with the seat cushion subassembly according to the fourth embodiment of the present invention.
Figure 32:
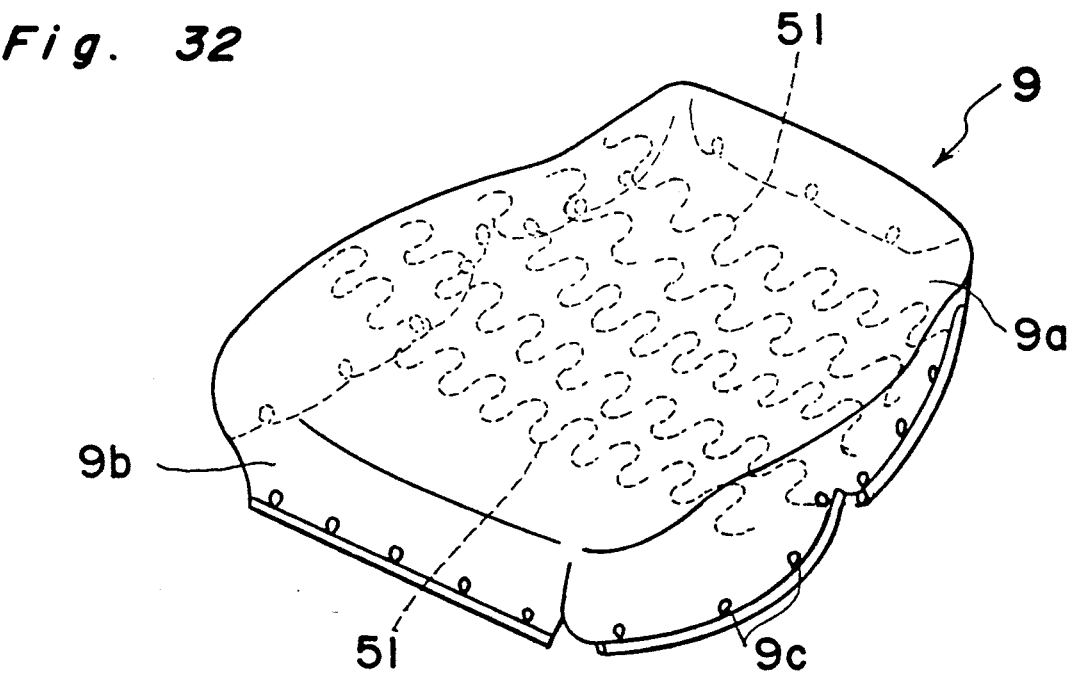
FIG. 32 is a perspective view showing a seat covering used on the seat cushion subassembly according to the fourth embodiment of the present invention.
Figure 33:
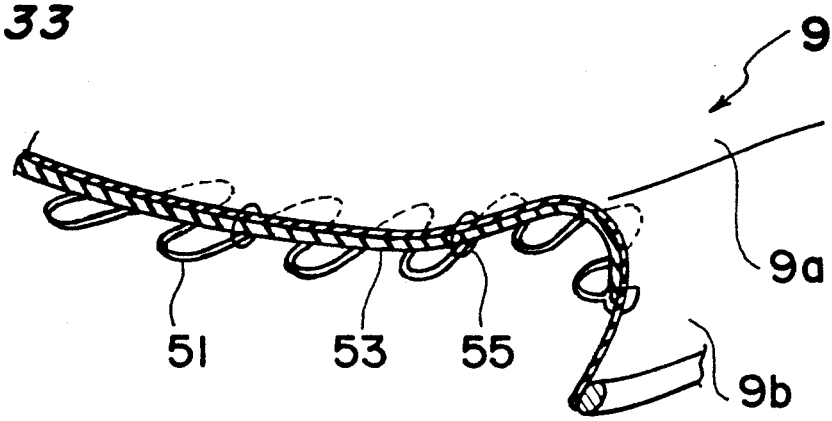
FIG. 33 is a fragmentary sectional view, on an enlarged scale, showing how one wavy wire spring is secured to the seat covering.

The seat covering 9 used in a fourth embodiment of the present invention illustrated in FIGS. 28 to 33 is best shown in FIGS. 32 and 33, reference to which will first be made. The seat covering 9 shown therein has a generally rectangular seat area 9a and a peripheral skirt 9b for enclosing the front, rear and lateral sides of the seat cushion subassembly SC, the skirt 9b having a plurality of equally spaced tie holes for the passage of a strapping used to removably secure the seat covering 9 to the seat cushion subassembly SC. The seat covering 9 may be made of any suitable textile fabric, either natural or synthetic, of a type generally used in association with loungers, sofa or any other seats.

The seat area 9a of the seat covering 9 has an inner surface facing the cushioning bag 27 (FIG. 28), to which a plurality of wavy wire springs 51, spaced generally equally distantly from each other in a direction conforming to the longitudinal sense of the automobile body structure, are secured through a flexible elastic pad 53, as best shown in FIG. 33, so as to extend widthwise of the seat cushion subassembly SC. More specifically, as best shown in FIG. 33, each wavy wire spring 51 is secured to the inner surface of the seat area 9a of the seat covering 9 through the flexible elastic pad 53 by means of a plurality of tie yarns 55.

Figure 34:
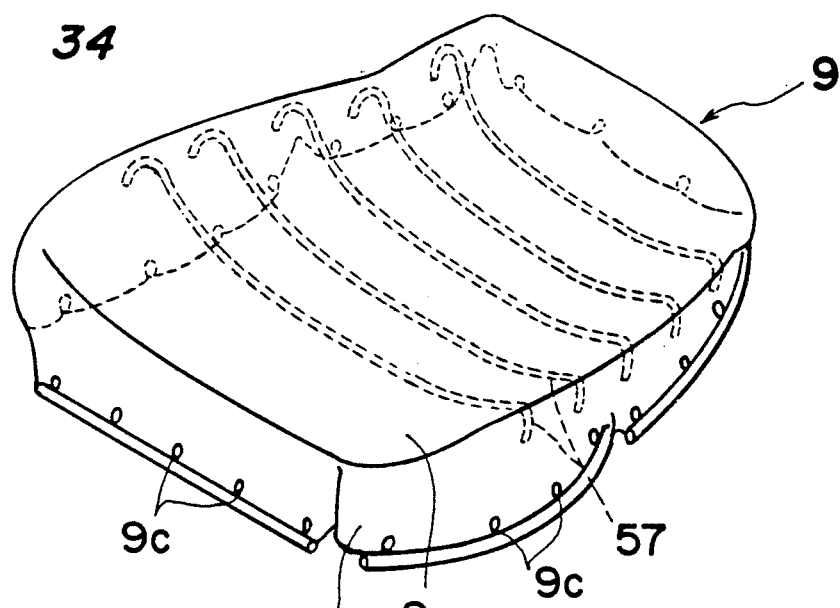
FIGS. 34 and 35 are views similar to FIGS. 32 and 33, respectively, showing a modified form of the seat covering.
Figure 35:
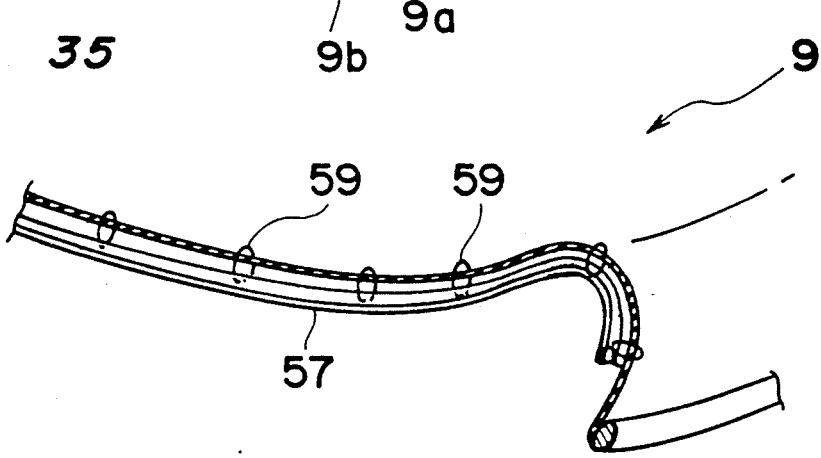

In a modified form of the seat covering 9 shown in FIGS. 34 and 35, instead of the use of the wavy wire springs 51 shown in FIGS. 32 and 33, a plurality of elongated leaf springs 57 are employed and secured to the inner surface of the seat area 9a of the seat covering 9 through a plurality of tie yarns 59. In this modification of FIGS. 34 and 35, although not shown, the elongated leaf springs 57 may be secured to the inner surface of the seat area 9a through the use of a similar flexible elastic pad which has been shown by 53 in FIG. 33.

Figure 29:
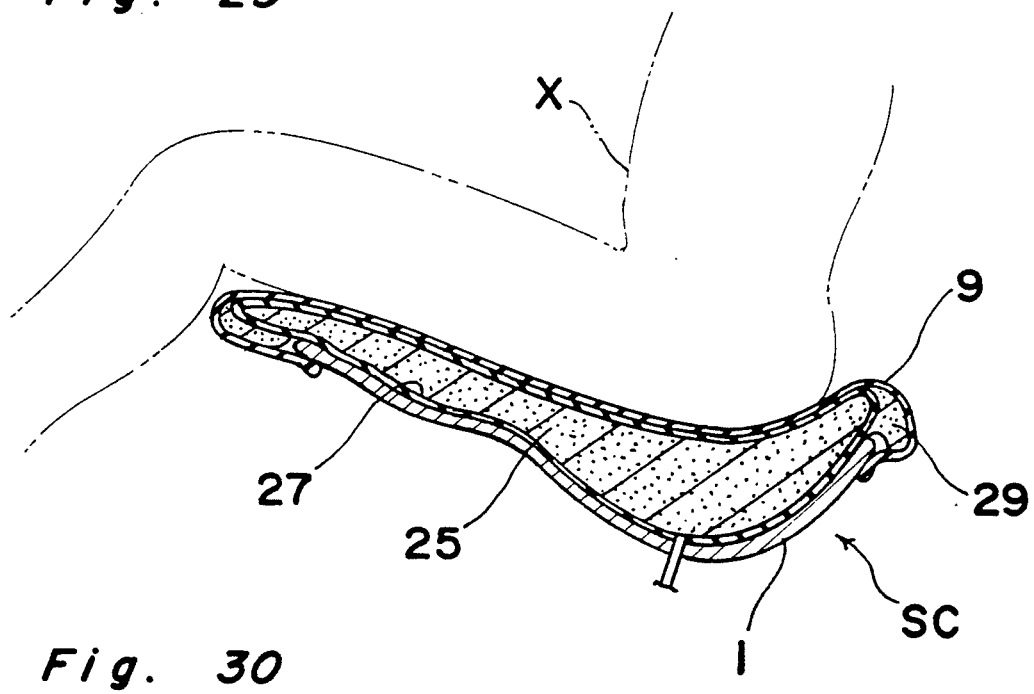
FIGS. 29 and 30 are views similar to FIG. 28, showing the seat cushion subassembly when the seat occupant sits thereon and after the seat occupant has left the seat cushion subassembly, respectively.

It will readily be understood that the use of the spring members, either the wavy wire springs 51 shown in FIGS. 32 and 33 or the elongated leaf springs 57 shown in FIGS. 34 and 35, in the seat covering 9 is effective to keep the seat area 9a of the seat covering 9 substantially taut at all times so long as the seat occupant does not occupy the seat assembly S and regardless of the shape of the cushioning layer 25 as clearly shown in FIG. 30. On the other hand, when and so long as the seat occupant sits on the seat cushion subassembly SC as shown in FIG. 29, not only can the cushioning layer 25 be depressed, but also the spring members, either the wavy wire springs 51 or the elongated leaf springs 57, are downwardly deformed to follow generally the curvature of the lower body part of the seat occupant X including the glutea region and the dorsal femoral region.

FIG. 31 illustrates a pneumatic circuit in combination with a cushioning control system which can be utilized in connection with the seat assembly S according to the fourth embodiment of the present invention. With reference to FIG. 31, the system shown therein is substantially identical with that shown in and described with reference to FIG. 12. However, in the system of FIG. 31, the occupation sensor is employed in the form of a load actuated switch OSw capable of assuming one of two states, that is, ON and OFF states, and, also, the system itself is so designed and so tailored as to operate in the following manner.

Assuming that the automobile ignition switch is turned on, the vacuum pump Pb is held still and the valve assembly Vb is held in an open position so long as the seat occupant has not yet sat on the seat cushion subassembly SC. In this condition, the pressure inside the cushioning bag 27 is generally kept equal to the atmospheric pressure and the cushioning layer 25 is held in an uncompressed state. As the seat occupant sits on the seat cushion subassembly SC, not only are the spring members deformed downwardly as hereinbefore described, but the load actuated switch OSw is turned on.

When the seat occupant after having been seated on the seat cushion subassembly SC manipulates the switch SW to establish an occupant holding mode while the load actuated switch OSw has been turned on as hereinabove described, and since the switching valve assembly Vb is at this time brought in an open position, the vacuum pump Pb is driven to draw air within the cushioning bag 27 to the outside, causing the cushioning layer 25 to be compressed to such an extent a to permit the seat cushion subassembly SC as a whole to represent a shape generally following the curvature of the lower body part of the seat occupant to thereby provide a comfortable support. In any event, when the pressure inside the cushioning bag 27 being reduced by the action of the vacuum pump Pb attains a predetermined value preset in the pressure sensor PSb, the latter issues an output signal to the control unit CUa which in turn causes the vacuum pump Pb to be brought to a halt and also the valve assembly Vb to be brought to a closed position, thereby fixing the seat cushion subassembly SC to the particular shape appropriate to provide the comfortable support to the seat occupant with the cushioning layer 25 kept in an appropriately compressed state. In this condition, the seat cushion subassembly SC having the cushioning layer 25 kept in the appropriately compressed state is somewhat rigid as compared with that where the cushioning layer 25 has not been compressed, that is, held in the uncompressed state, sufficient to permit the seat occupant to feel comfortable while seated and also to provide a satisfactory holding property on support to the lower body part of the seat occupant.

On the other hand, when the seat occupant leaves the seat assembly SC, the load which has been imposed on the seat cushion subassembly SC is released and, therefore, the load actuated switch OSw is turned off to cause the control unit CUa to bring the valve assembly Vb into the opened position. When the valve assembly Vb is brought to the opened position while the vacuum pump Pb is held inoperative, air is introduced into the cushioning bag 27 and therefore the pressure inside the cushioning bag 27 is progressively equalized to the atmospheric pressure while permitting the cushioning layer 25 to be restored to its original shape.

As hereinbefore discussed in connection with the seat system of FIG. 15, the restoration of the cushioning layer 25 back to the original shape upon the introduction of air into the cushioning bag 27 requires a relatively long time. More specifically, the restoration of the cushioning layer 25 takes place in such a way as to absorb air, introduced into the cushioning bag 27 during the opening of the valve assembly Vb while the vacuum pump Pb is held inoperative, and accordingly, it takes a relatively long time to increase the pressure inside the cushioning bag 27 to a value necessary for the cushioning layer 25 to assume the uncompressed state. However, the use of the spring members, either the wavy wire springs 51 or the elongated leaf springs 57, is effective to permit the seat area 9a of the seat covering 9 to immediately restore to its original position as shown in FIG. 30 while the cushioning layer 25 still is undergoing its restoration process.

It is to be noted that the seat covering 9 of the construction shown in and described with reference to any one of FIGS. 32 and 33 and FIGS. 34 and 35 can be used on the seat cushion subassembly SC according to any one of the previously described and subsequently described embodiments of the present invention.

Figure 36:
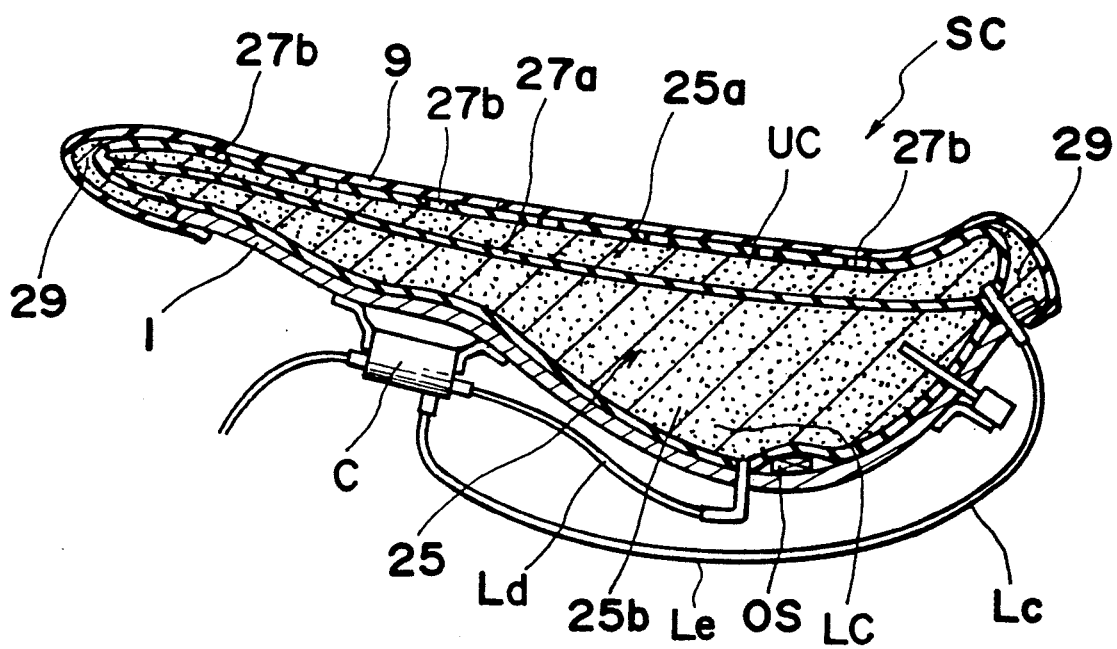
FIG. 36 is a side sectional view, substantially similar to FIG. 19, showing a fifth preferred embodiment of the present invention.
Figure 37:
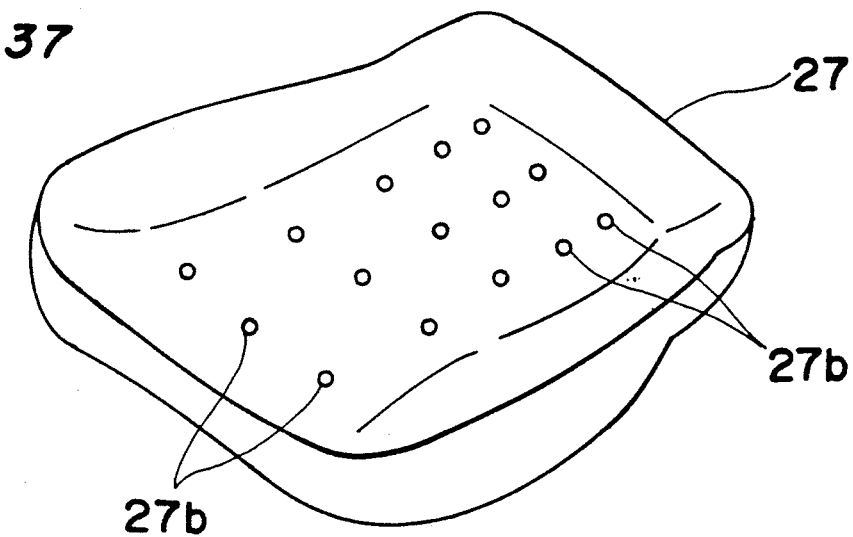
FIG. 37 is a schematic perspective view of the seat covering used on the seat cushion subassembly of FIG. 36.
Figure 38:
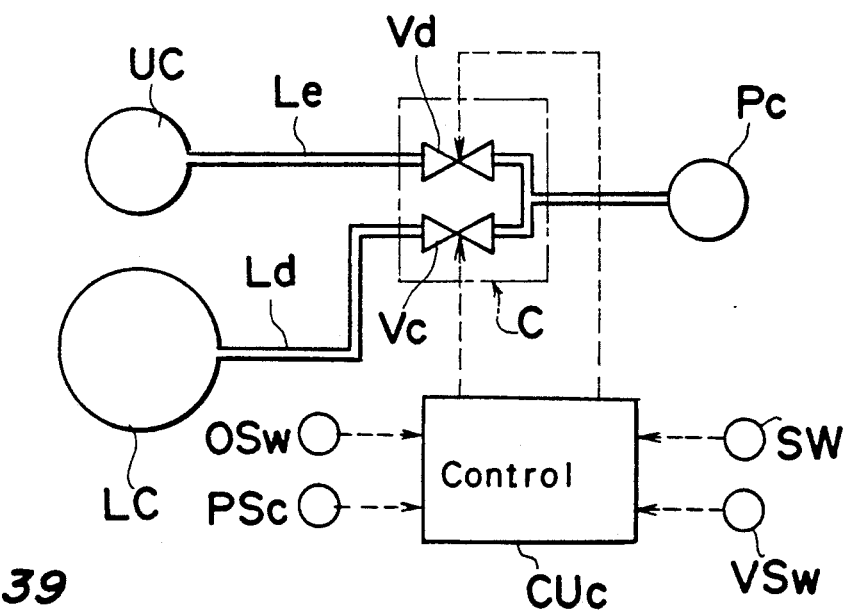
FIG. 38 is a diagram of a fluid control circuit used in connection with the fifth embodiment of the present invention.

FIGS. 36 to 38 illustrates a fifth preferred embodiment of the present invention. The seat cushion subassembly SC shown therein is substantially identical with that shown in and described with reference to FIG. 19. However, an upper portion of the cushioning bag 27 on one side of the elastic partition 27a opposite to a lower chamber LC and confronting the upper chamber UC in which an cushioning layer 25a is accommodated has a pattern of ventilating holes 27b.

As best shown in FIG. 38, the lower chamber LC is fluid-coupled with a piping Ld which is in turn fluid-coupled with a common vacuum pump Pc by way of an electromagnetic switching valve assembly Vc, whereas the upper chamber UC is fluid-coupled with a piping Le which is in turn fluid-coupled with the common vacuum pump Pc by way of an electromagnetic switching valve assembly Vd. The switching valves Vc and Vd are housed within a valve casing C which is secured from below to the bottom support 1 in a manner similar to that shown in FIG. 28 and are adapted to be controlled by the control unit CUc. The control unit CUc is adapted to receive the load signal from the load actuated switch OSw, a pressure signal generated from a pressure sensor PSc for detecting the pressure inside the lower chamber LC in the cushioning bag 27, a switching signal from the switch pad SW and a signal from a ventilation switch VSw and is so designed and so programmed as to operate in the following manner.

Assuming that the automobile ignition switch is turned on, the vacuum pump Pc is held still and both of the valve assemblies Vc and Vd are held in an open position so long as the seat occupant has not yet sat on the seat cushion subassembly SC. In this condition, the pressure inside the cushioning bag 27 is generally kept equal to the atmospheric pressure and both of the cushioning layers 25a and 25b within the upper and lower chambers UC and LC are held in an uncompressed state. As the seat occupant sits on the seat cushion subassembly SC, not only will the cushioning layer 25a within the upper chamber UC be immediately compressed to accommodate the pressure of the occupant because the cushioning layer 25a is softer than the cushioning layer 25b within the lower chamber LC, but also the load actuated switch OSw is turned on.

When the sea occupant after having been seated on the seat cushion subassembly SC manipulates the switch SW to establish the occupant holding mode while the load actuated switch OSw has been turned on as hereinabove described, the vacuum pump Pb is driven. Since at this time both of the switching valve assemblies Vc and Vd are held in open positions, air within the upper chamber UC and that within the lower chamber LC are drawn to the outside by the vacuum pump Pc, causing the cushioning layers 25a and 25b to be compressed to such an extent as to permit the seat cushion subassembly SC as a whole to conform to a shape generally following the curvature of the lower body part of the seat occupant to thereby provide a comfortable support. In any event, when the pressure inside the lower chamber LC being reduced in volume by the action of the vacuum pump Pc attains a predetermined value preset in the pressure sensor PSc, the latter issues an output signal to the control unit CUa which in turn causes the vacuum pump Pc to be brought to a halt and also both of the valve assemblies Vc and Vd to be brought in the closed positions, thereby fixing the seat cushion subassembly SC to the particular shape appropriate to provide comfortable support to the seat occupant.

The occupant holding function of the seat assembly S according to the embodiment of FIGS. 36 to 38 is accomplished mainly by the cushioning layer 25b within the lower chamber LC of the cushioning bag 27. In contrast thereto, the cushioning layer 25a within the upper chamber UC of the cushioning bag 27 will not provide as much of the occupant holding function as that accomplished by the cushioning layer 25b because of the presence of the ventilation holes 27b, that is, because the upper chamber UC of the cushioning bag 27 is communicated with the atmosphere at all times. However, the cushioning layer 25a within the upper chamber UC will not hamper the occupant holding function of the cushioning layer 25b within the lower chamber LC because the cushioning layer 25a is smaller in thickness than the cushioning layer 25b. It is to be noted that, while the cushioning layer 25b within the lower chamber LC of the cushioning bag 27 performs the occupant holding function, the cushioning layer 25a within the upper chamber UC of the cushioning bag 27 is compressed to provide a rigidity necessary to hold the lower body part of the seat occupant. At the same time, the presence of the ventilation holes 27b in the upper portion of the seat covering 9 permits breathing of the cushioning layer 25a within the upper chamber UC to provide flexibility necessary to fit the shape of the lower body part of the seat occupant.

It is also to be noted that, as far as the adaptability of the seat cushion subassembly SC to the shape of the lower body part of the seat occupant is concerned, the upper cushioning layer 25a within the upper chamber UC of the cushioning bag 27 may be chosen to have an elasticity higher than that of the lower cushioning layer 25b within the lower chamber UC of the same cushioning bag 27.

Where an insufficient ventilation is obtained, the seat occupant may manipulate the ventilation switch VSw to establish a forced ventilating mode during which only the switching valve assembly Vd is brought to the opened position. Once the switching valve assembly Vd is opened in the manner as hereinabove described, the ambient air outside the cushioning bag 27 can be forcibly drawn into the upper chamber UC through the ventilation holes 27b to thereby facilitate the ventilation.

On other hand, when the seat occupant leaves the seat assembly S, the load which has been imposed on the seat cushion subassembly SC is released and, therefore, the load actuated switch OSw is turned off to cause the control unit CUa to bring both of the valve assemblies Vc and Vd into the opened positions. When both of the valve assemblies Vc and Vd are brought to the opened positions, the cushioning layers 25a and 25b within the upper and lower chambers UC and LC of the cushioning bag 27 restore to their respective original shapes.

Figure 39:
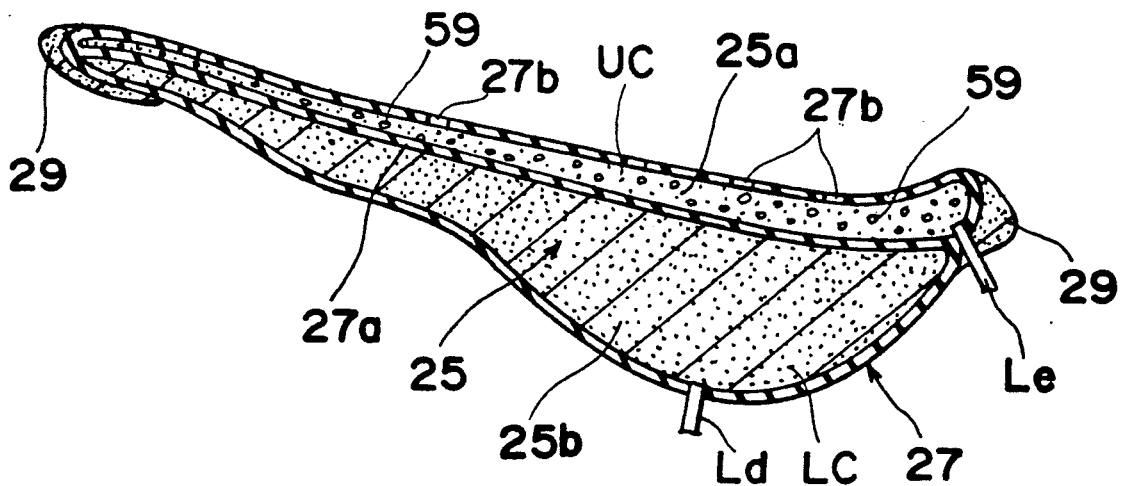
FIGS. 39 an 40 are views similar to FIG. 36, showing first and second modifications of the fifth embodiment of the present invention.

If desired, moisture absorbing particles 59 such as particles of silica gel may be included and scattered in the upper cushioning layer 25a as shown in FIG. 39 to positively absorb moisture generated from the seat occupant.

FIGS. 40 to 46 illustrates various methods of improving the cushioning property of the seat cushion subassembly SC, each of which is applicable to any one of the previously described and subsequently described embodiments of the present invention. These methods are devised in view of the fact that the seat cushion subassembly SC may have various sites where different loads act when a particular seat occupant sits thereon and/or depending on the physical or corporeal build of the lower body part of a particular seat occupant. In general, however, it is well recognized that the particular site of the seat cushion subassembly SC which supports the glutea region of the seat occupant may receive a load greater than the load acting on a site of the seat cushion subassembly SC generally aligned with the medial femoral regions in the lower body part of the seat occupant. Therefore, the following methods are advantageous in that the seat cushion subassembly SC can provide a varying cushioning property to different regions of the lower body part of the seat occupant to permit the latter to feel comfortable while seated.

In describing the various methods of improving the cushioning property, reference will be made to the seat cushion subassembly SC structured and operable in the manner as shown in and described with reference to FIGS. 28 to 31, although any one of these methods can be applicable to any one of the embodiments of the present invention wherein the cushioning layer 25 is employed.

Figure 40:
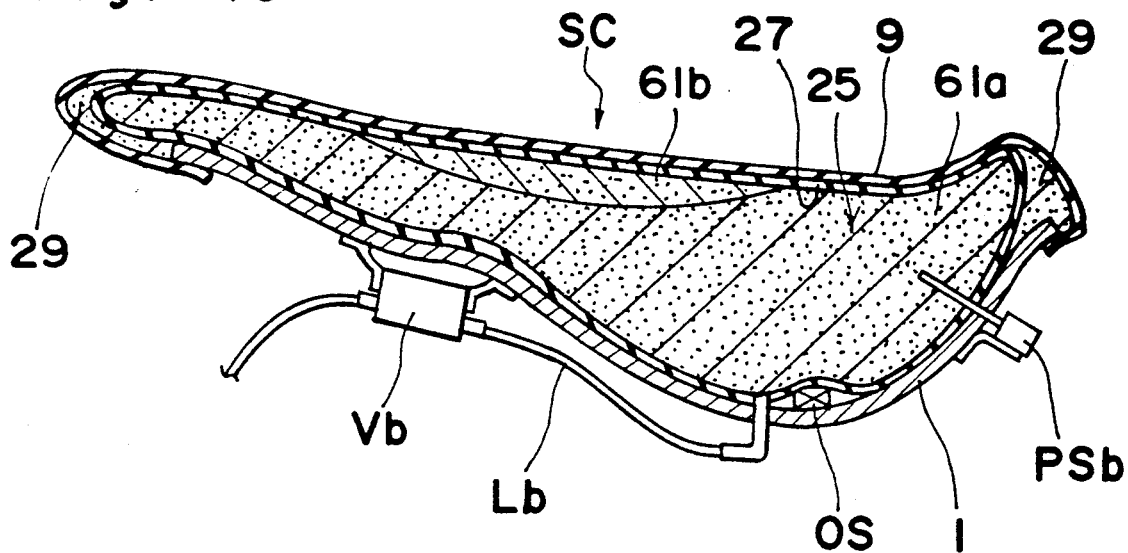
Figure 41:
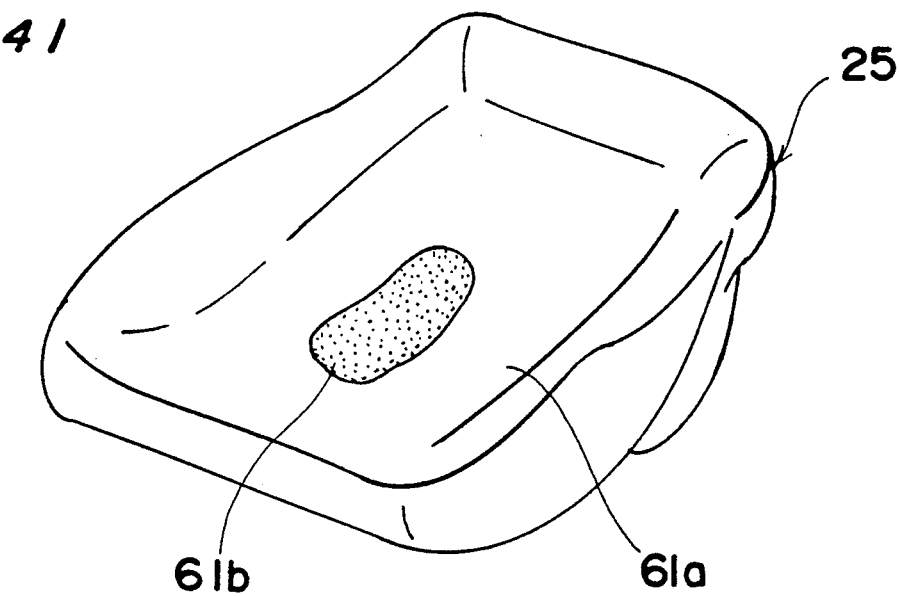
FIG. 41 is a schematic perspective view of a seat cushion pad used in the seat cushion subassembly according to the modification of FIG. 40.

Referring first to FIGS. 40 and 41, the cushioning layer 25 is of the two component type having a relatively hard cushioning body 61a and a relatively soft cushioning body 61b. The relatively hard cushioning body 61a may be made of expanded polyurethane of open celled structure and has a volume of cells greater than that of the relatively soft cushioning body 61b. As best shown in FIG. 41, the relatively soft cushioning body 61b occupies an upper portion of the relatively hard cushioning body 61a and is located at a site of the seat cushion subassembly SC which generally corresponds to the medial femoral regions in the lower body part of the seat occupant.

Since the relatively soft cushioning body 61b is more pliable and deformable than the relatively hard cushioning body 61a, a portion of the seat cushion subassembly SC corresponding to the medial femoral regions in the lower body part of the seat occupant sitting on the seat cushion subassembly SC will not raise when the air inside the cushioning bag 27 is withdrawn to permit the cushioning layer 25 to assume a shape corresponding to the curvature of the lower body part of the seat occupant to provide favorable holding and support.

In the method shown in FIG. 42, the cushioning layer 25 within the cushioning bag 27 has a lower portion formed with a cavity 63a defined at a location immediately below the site of the seat cushion subassembly SC which supports the medial femoral regions in the lower body part of the seat occupant.

Figure 42:
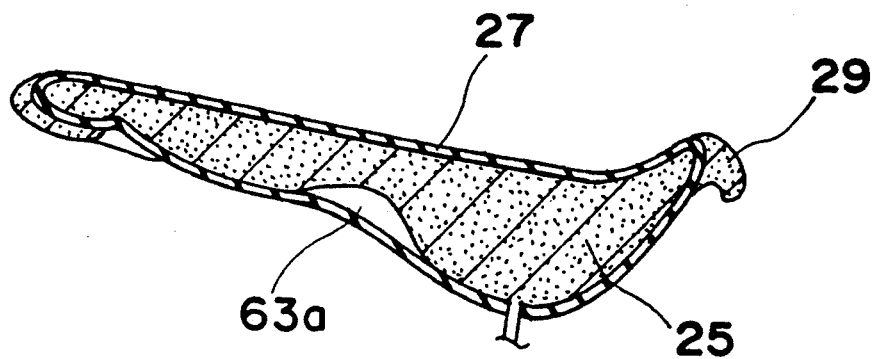
FIGS. 42 to 44 are views similar to FIG. 36, showing third, fourth and fifth modifications of the fifth embodiment of the present invention.
Figure 43:
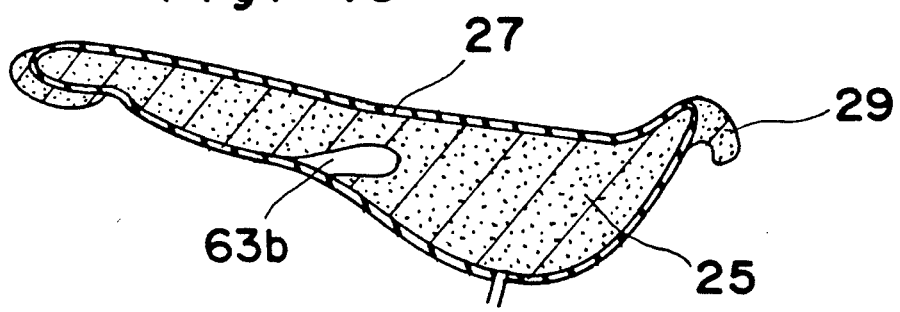

While the cavity 63a shown in FIG. 42 is of a shape corresponding to the shape of an inverted cup, the cavity 63b shown in FIG. 43 is in the form of a deep recessor cave extending into the cushioning layer 25 and defined at a location immediately below the site of the seat cushion subassembly SC which supports the medial femoral regions in the lower body part of the seat occupant.

Figure 44:
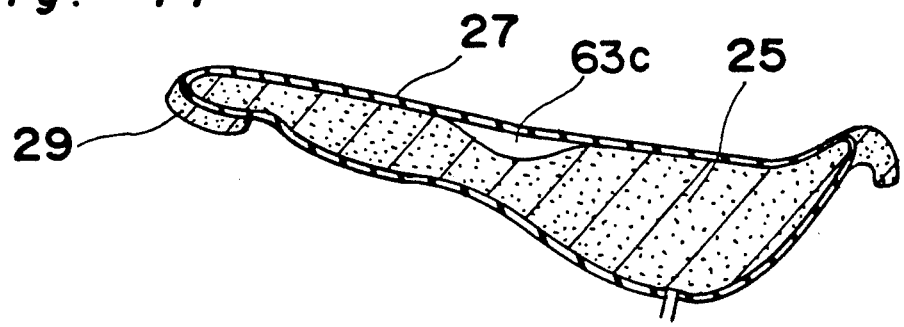

In the method shown in FIG. 44, the cavity 63c is defined in the upper portion of the cushioning layer 63c at a location corresponding to the site of the seat cushion subassembly SC which supports the medial femoral regions in the lower body part of the seat occupant.

Figure 45:
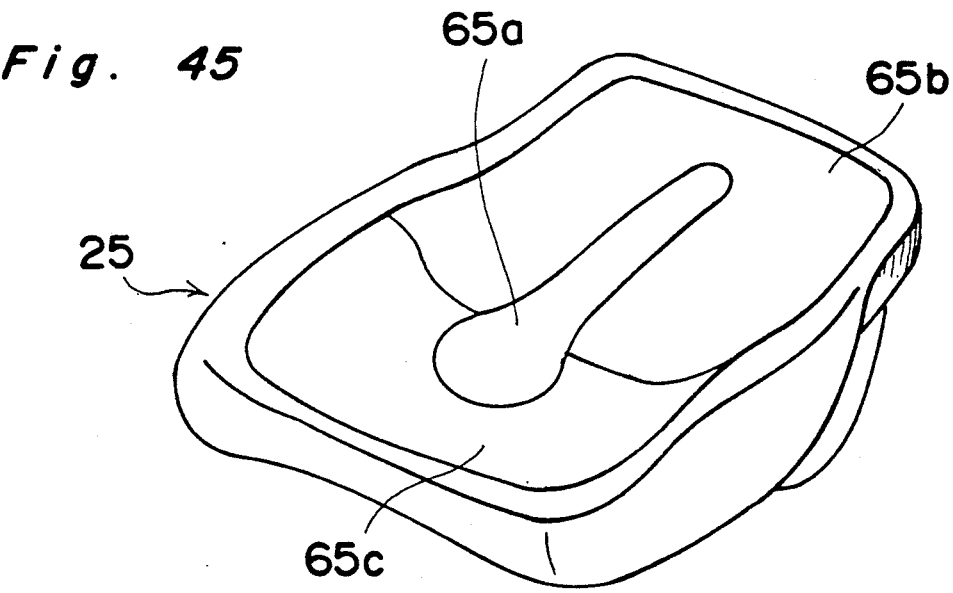
FIG. 45 is a schematic perspective view of the seat cushion pad used in the seat cushion subassembly according to a sixth modification of the fifth embodiment of the present invention.
Figure 46:
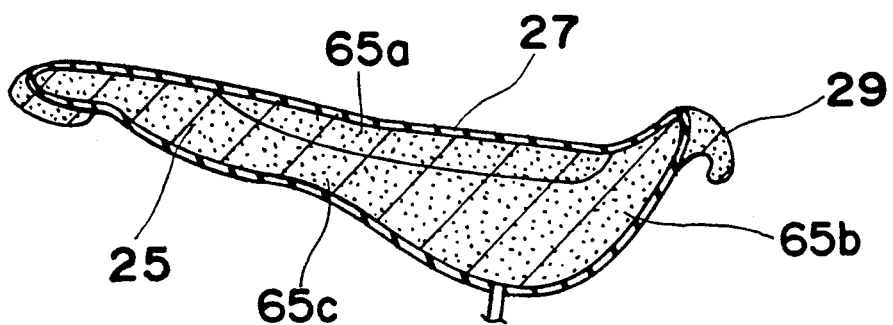
FIG. 46 is a side sectional view of the seat cushion subassembly employing the seat cushion pad of FIG. 45.

The cushioning layer 25 shown in FIGS. 45 and 46 is of the three component type having a center cushioning body 65a formed on the upper portion of the cushioning layer 25 and positioned at a location corresponding to the site of the seat cushion subassembly SC which generally corresponds to the medial femoral regions in the lower body part of the seat occupant, a rear cushioning body 65b occupying a rear half of the cushioning layer 25 and a front cushioning body 65c occupying a front half of the cushioning layer 25. The elasticity of the center cushioning body 65a is highest of all while the elasticity of the rear cushioning body 65b is lowest of all, and the front cushioning body 65c has an elasticity intermediate of those of the center and rear cushioning bodies 65a and 65b. A lower elasticity is chosen for the front cushioning body 65c so as to provide a relatively high freedom of movement to the femoral regions of the seat occupant during a pedalling operation.

FIGS. 47 to 62 illustrate a sixth preferred embodiment of the present invention.

Figure 47:
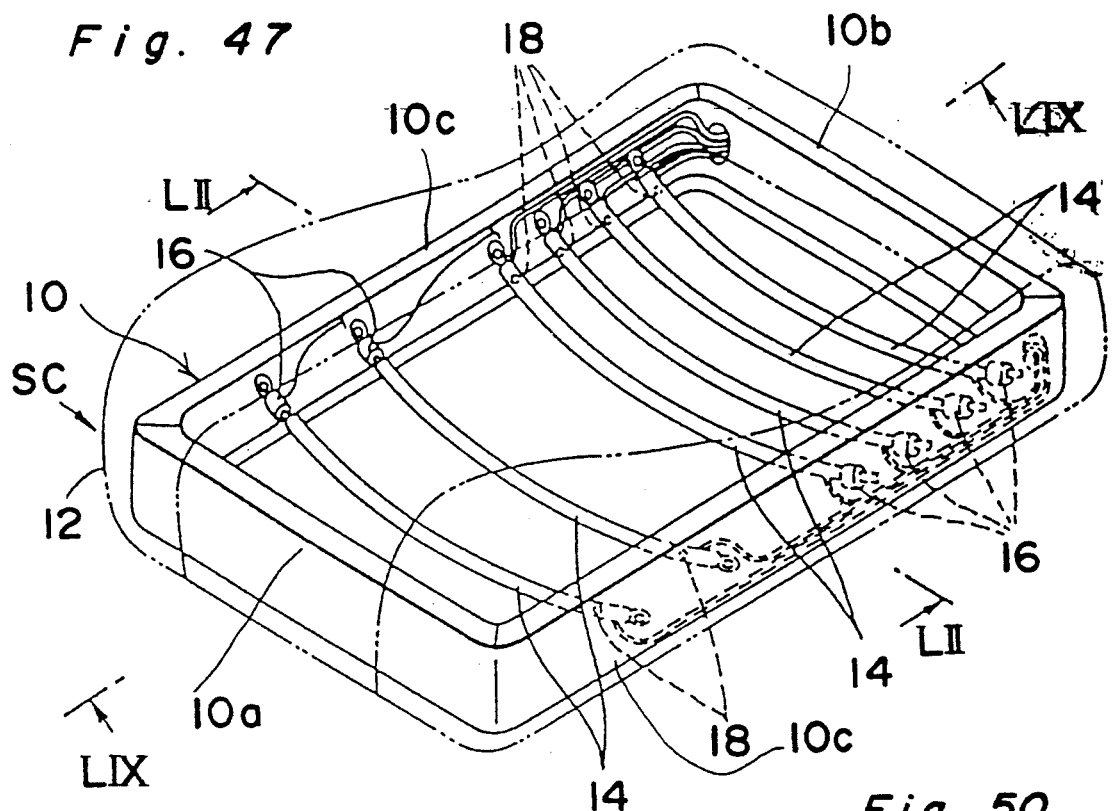
FIG. 47 is a schematic perspective view of the seat cushion subassembly according to a sixth preferred embodiment of the present invention.

Referring first to FIG. 47, there is shown a seat cushion subassembly SC which comprises a generally rectangular support frame structure 10 having front and rear frames 10a and 10b and a pair of side frames 10c, a seat cushion pad 12 mounted so as to overlay the frame structure 10, and a plurality of flexible expandable tubes or tubings 14 situated within a space delimited by the frame structure 10 and pivotally connected at their opposite ends with the respective side frames 10c so as to extend between the side frames 10c. The seat cushion had 12 is so mounted on the frame structure 10 with its opposite side portions supported on the side frames 10c while a generally intermediate portion thereof is supported on the flexible expandable tubings 14. The flexible expandable tubings 14 are of identical construction with each other, each having one end provided with a load cell 16 and the opposite end provided with a pressure sensor 18.

Figure 48:
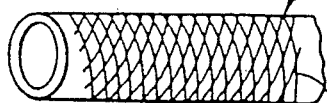
FIGS. 48 to 50 are fragmentary side views of one form of tubes used in the seat cushion subassembly of FIG. 47, shown in different operative conditions, respectively.
Figure 49:
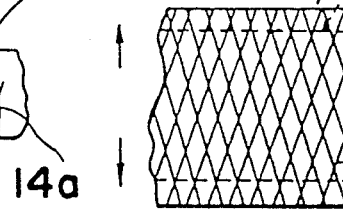
Figure 50:
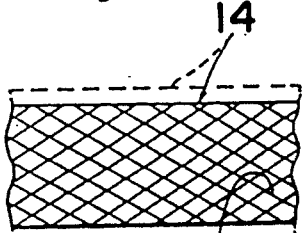

As best shown in FIGS. 48 to 50, each of the flexible expandable tubings 14 is made of an elastic material such as, for example, natural or synthetic rubber and is in the form of a braided tubing having a fiber braided outer sheath 14a. Each flexible expandable tubing 14 is of a type capable of being radially and axially expandable depending on the pressure created within the hollow of the respective flexible expandable tubing 14. More specifically, assuming that each flexible expandable tubing 14 has a given inner diameter and a given length when the pressure within the hollow thereof is equal to the atmospheric pressure as shown in FIG. 48, an increase of the pressure within the hollow of the flexible expandable tubing 14 results in a radially outward expansion of the tubing 14 accompanied by an axial contraction as shown in FIG. 49, but a decrease of the pressure within the hollow of the flexible expandable tubing 14 results in a radially inward contraction of the tubing 14 accompanied by an elongation as shown in FIG. 50. The braided sheath 14a on each flexible expandable tubing 14 not only follows the motions of the associated flexible expandable tubing 14 that take place according to the pressure inside the tubing 14, but also restricts the extent to which the tubing 14 can expand radially outwardly thereby avoiding any possible rupture of the tubing 14.

Figure 52:
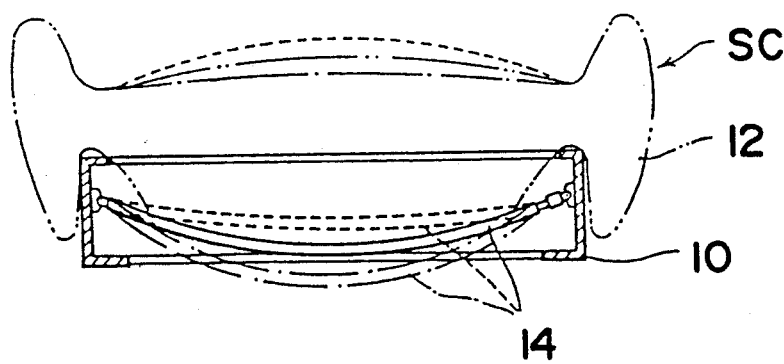
FIG. 52 is a cross-sectional view taken along the line LII—LII in FIG. 47.

Because of the unique nature of the flexible expandable tubings 14 employed in the seat cushion subassembly SC according to the present invention, each flexible expandable tubing 14 assuming a position shown by the solid lines in FIG. 52 can stretch to assume a position shown by the broken line in FIG. 52 when the pressure inside the respective tubing 14 is increased to a value higher than a predetermined or initial pressure, but can droop to assume a position shown by the single-dotted chain lines in FIG. 52 when the pressure inside the respective flexible expandable tubing 14 is decreased to a value lower than the predetermined or initial pressure.

Figure 51:
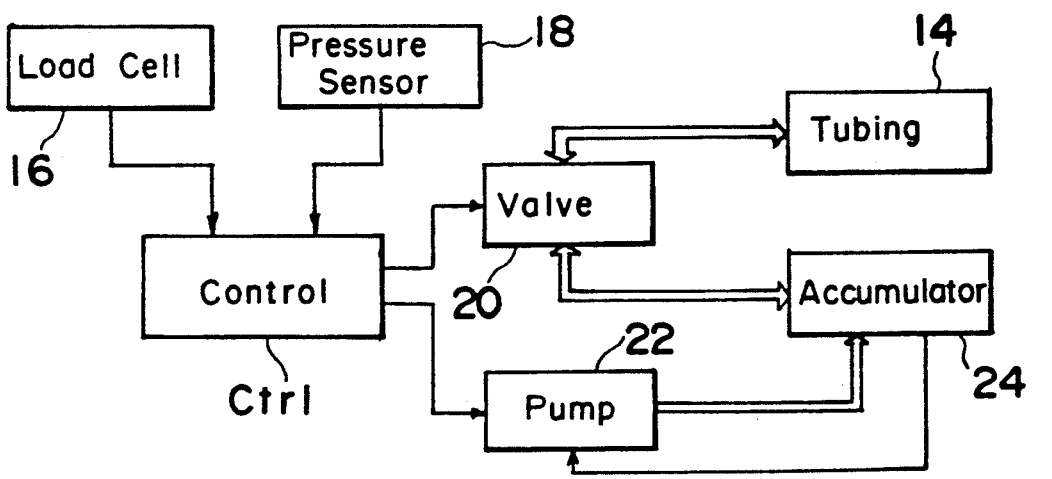
FIG. 51 is a diagram of a fluid control circuit used in association with the seat cushion subassembly according to the sixth embodiment of the present invention.

The control of a distribution of the load imposed by a seat occupant on the seat cushion subassembly SC according to the sixth embodiment of the present invention will now be described with reference to a circuit block diagram of FIG. 51.

Assuming that the seat occupant sits on the seat cushion subassembly SC, the load cells 16 coupled with the respective flexible expandable tubings 14 detect pressures acting on the seat cushion subassembly SC and provide output signals to a controller Ctrl which may be comprised of a microcomputer. The controller Ctrl is so designed and so programmed as to infer the physical build of the seat occupant from the sum of load information provided by the outputs from the load cells 16 and as to infer the physical shape of the seat occupant including the position of the ischial tuberosities in the lower body part of the seat occupant from the individual load information, to thereby infer the distribution of pressure then imposed by the seat occupant on the seat cushion subassembly SC.

Also, the controller Ctrl is electrically connected with the pressure sensors 18 and, therefore, the controller Ctrl can call for an internal pressure control data for each flexible expandable tubing 14 for providing an optimum distribution of pressure relative to the seat occupant on the basis of a data base stored in the microcomputer and subsequently adjusts the internal pressure in each of the flexible expandable tubing 14 on the basis of the internal pressure control data.

In other words, pressure supply lines each leading to the respective flexible expandable tubing 14 are provided with associated control valve 20. Therefore, the controller Ctrl can output a control signal to each of the control valves 20 to control the selective opening and closure of the respective control valve 20 to cause the internal pressure in the associated flexible expandable tubing 14 to attain a predetermined value determined by the pressure control valve.

Consequently, each of the flexible expandable tubings 14 can have its length adjusted according to the internal pressure in such flexible expandable tubing 14 and, therefore, such flexible expandable tubing 14 can be selectively stretched or caused to droop to thereby deform respective sites of the seat cushion pad 12 to shapes required to develop a favorable pattern of distribution of pressure relative to the seat occupant.

Each of the control valves 20 is communicated with a pump device 22 through an accumulator 24 for accumulating therein a pneumatic pressure created by the pump device 22. It is to be noted that the initial internal pressure in each flexible expandable tubing 14, that is, the pressure in each flexible expandable tubing 14 before the seat occupant actually sits on the seat cushion subassembly SC, is selected to be of a value generally intermediate between maximum and minimum pressures determined by the rated pressure of the pump device 22. It is also to be noted that, after the seat occupant leaves the seat cushion subassembly SC, the controller Ctrl can, in response to the respective outputs from the load cells 16, generate to each control valve 20 a control signal necessary to return the internal pressure in the respective flexible expandable tubing 14 to the initial internal pressure.

Figure 53:
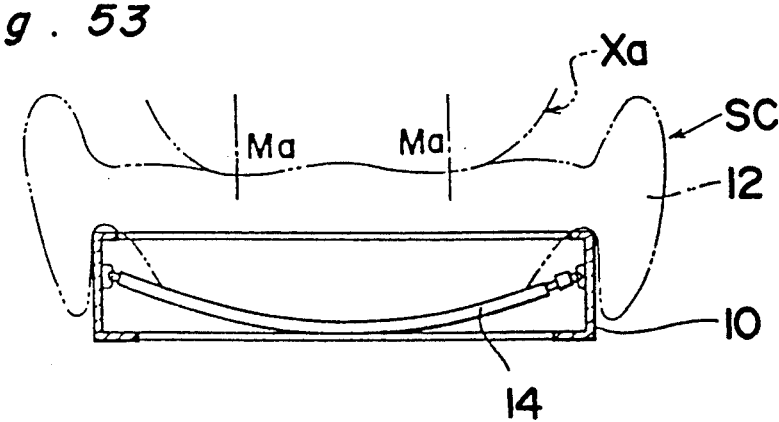
FIGS. 53 and 54 are views similar to FIG. 52, showing how the seat cushion subassembly according to the sixth embodiment of the present invention works when a seat occupant of relatively small build sits thereon.
Figure 55:
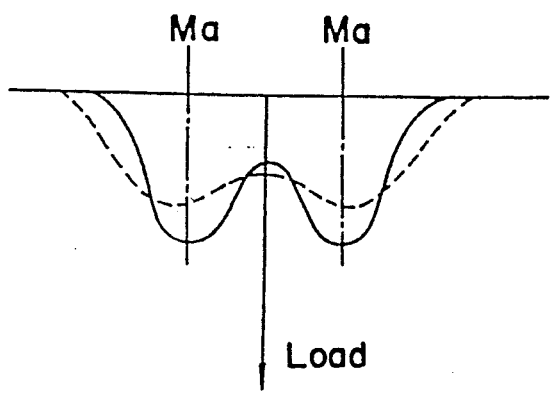
FIG. 55 is a graph showing a pattern of distribution of pressure exhibited by the seat cushion assembly of FIG. 47 when the seat occupant of relatively small build sits thereon.

An example of the control of the pattern of distribution of pressure relative to the seat occupant will now be described with particular reference to FIGS. 53 to 62.

Where a seat occupant of relatively small build sits on the seat cushion subassembly SC as shown in FIG. 53, the seat cushion subassembly SC would be relatively stiff for such a seat occupant and, therefore, as shown by a solid line in the graph of FIG. 55, a pressure transmitted from the seat cushion subassembly SC to the seat occupant Xa will be highest at locations corresponding to the ischial tuberosities Ma in the lower body part of the seat occupant. Once this occurs, the seat occupant may feel uncomfortable while seated, having suffered from, for example, bad blood circulation. Therefore, in such case, the seat cushion subassembly SC has to be adjusted so soft that the pressure can act from the seat cushion subassembly SC to the lower body part of the seat occupant in a generally uniformly distributed pattern favorable to the seat occupant of relatively small build.

Figure 54:
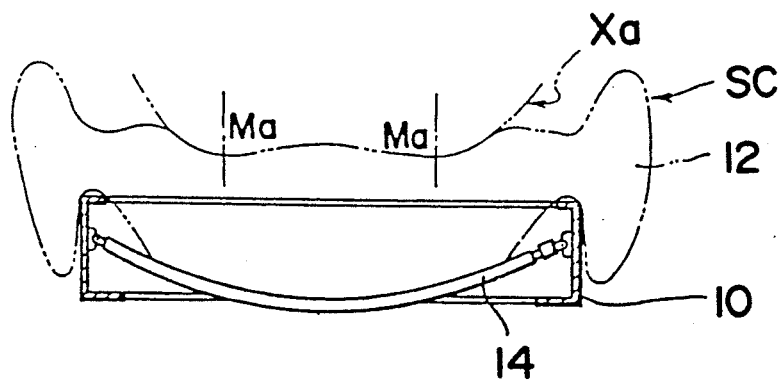

In view of the foregoing, the control valves 20 have to be adjusted to lower the internal pressures in the respective flexible expandable tubings 14 so that, as shown in FIG. 54, the flexible expandable tubings 14 can be elongated while drooping a predetermined amount downwards. As a result thereof, that generally intermediate portion of the seat cushion pad 12 which supports the lower body portion of the seat occupant is downwardly depressed in a quantity corresponding to the amount over which the flexible expandable tubings 14 has drooped as hereinabove described. Accordingly, as shown by the broken line in FIG. 55, a favorable pattern of distribution of pressure relative to the seat occupant can be obtained.

Figure 56:
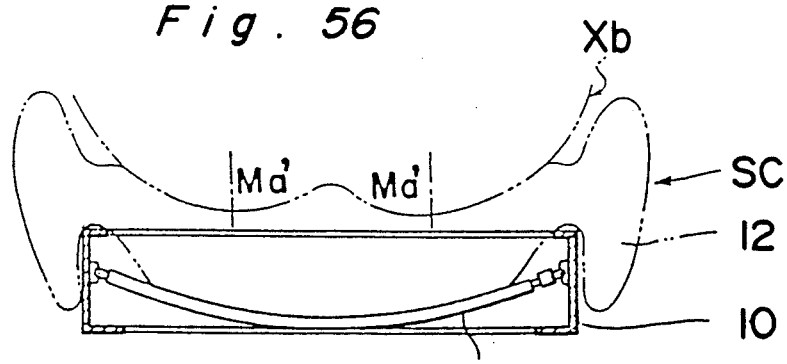
FIGS. 56 and 57 are views similar to FIG. 52, showing how the seat cushion subassembly according to the sixth embodiment of the present invention works when a seat occupant of relatively big build sits thereon.
Figure 58:
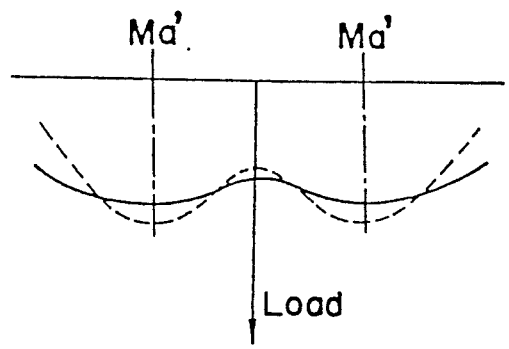
FIG. 58 is a graph showing a pattern of distribution of pressure exhibited by the seat cushion assembly of FIG. 47 when the seat occupant of relatively big build sits thereon.

On the other hand, where a seat occupant of relatively big build sits on the seat cushion subassembly SC as shown in FIG. 56, the seat cushion subassembly SC would be too soft for such a seat occupant and, therefore, as shown by a solid line in the graph of FIG. 58, a pressure transmitted from the seat cushion subassembly SC to the seat occupant Xb will exhibit a moderate change insufficient to provide a good holding or supporting capability. Once this occurs, the seat occupant will readily get tired when he or she sits on the seat cushion subassembly SC for a substantial length of time and, also, the seat occupant may feel uncomfortable because the seat cushion subassembly SC would provide a feeling as if it were clinging to the seat occupant. In such case, therefore, the seat cushion subassembly SC has to be adjusted to be stiff that the pressure can act from the seat cushion subassembly SC to the lower body part of the seat occupant in a generally uniformly distributed pattern favorable to the seat occupant Xb of relatively big build.

Figure 57:
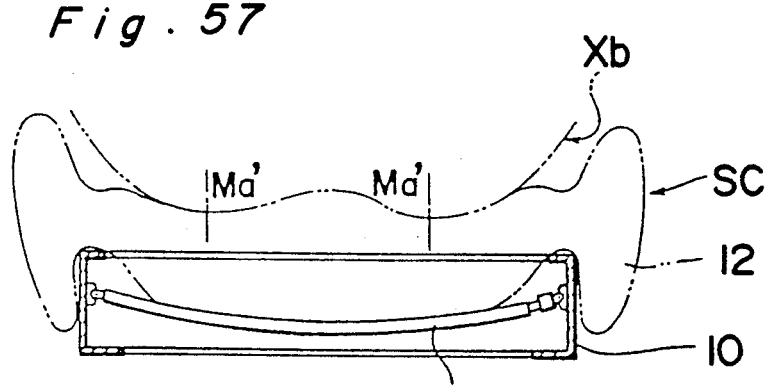

In view of the foregoing, the control valves 20 have to be adjusted to increase the internal pressures in the respective flexible expandable tubings 14 so that, as shown in FIG. 57, the flexible expandable tubings 14 can be stretched with their lengths reduced substantially, to thereby raise that generally intermediate portion of the seat cushion pad 12 which supports the lower body portion of the seat occupant Xb. Accordingly, as shown by the broken line in FIG. 58, the favorable pattern of distribution of pressure relative to the seat occupant can be obtained wherein the support is substantially provided at locations corresponding to the ischial tuberosities Ma' in the lower body part of the seat occupant.

Although in the foregoing description made with reference to FIGS. 53 to 58 reference has been made to the pattern of distribution of pressure in a direction widthwise of the seat cushion subassembly SC, a similar control of the distribution of pressure in a direction generally parallel to the longitudinal sense of the automobile body structure can be accomplished, which will now be described with reference to FIGS. 59 to 62.

Figure 59:
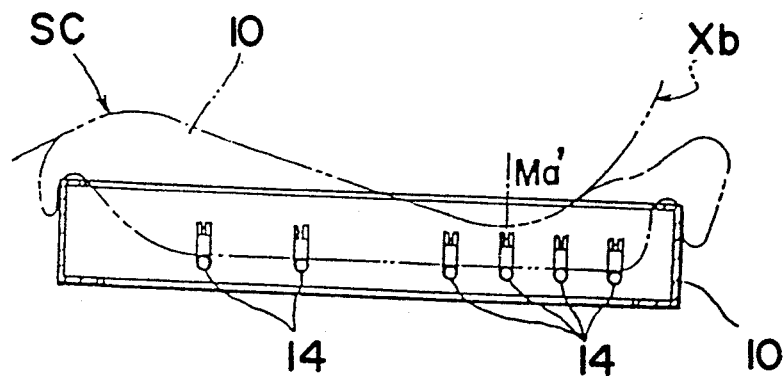
FIG. 59 is a cross-sectional view taken along the line LIX—LIX shown in FIG. 47.
Figure 60:
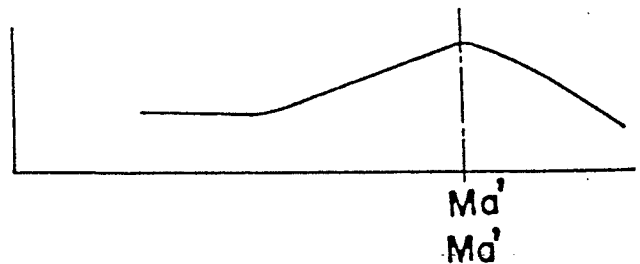
FIG. 60 is a graph showing a pattern of distribution of pressure in a direction parallel to the longitudinal sense of an automobile body structure when the seat occupant sits on the seat cushion subassembly according to the sixth embodiment of the present invention.
Figure 61:
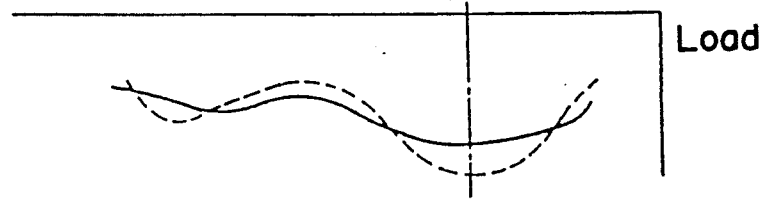
FIG. 61 is a graph showing a pattern of distribution of load imposed on the seat cushion subassembly in a direction parallel to the longitudinal sense of the automobile body structure when the seat occupant sits thereon.

By way of example, where the seat occupant Xb of relatively big build sits on the seat cushion subassembly SC, and so far as a generally intermediate portion of each of the flexible expandable tubings 14 remains in an initial state in which it extends substantially horizontally as shown in FIG. 59, the seat cushion subassembly SC would be too soft for such a seat occupant Xb and, therefore, as can be understood from the solid lines shown in the respective graphs of FIGS. 60 and 61, inadequate support is provided at locations corresponding to the ischial tuberosities Ma' at which a maximum load acts, resulting in the occurrence of inconveniences similar to those described previously. In such case, therefore, the seat cushion subassembly SC has to be adjusted to be stiffened.

Figure 62:
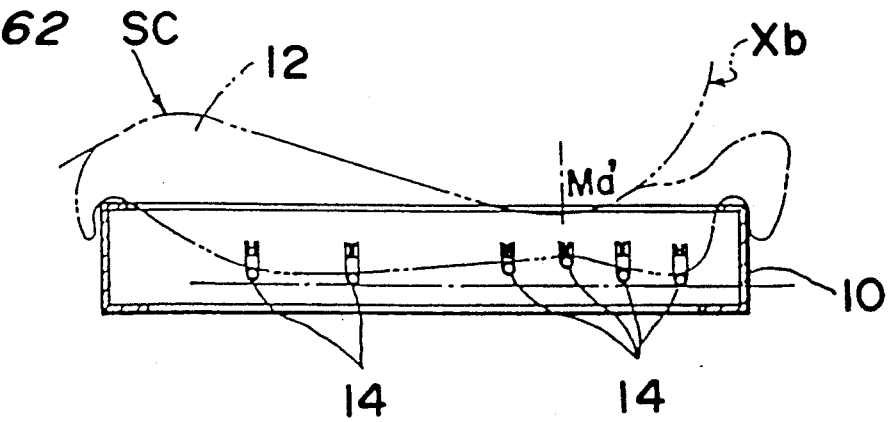
FIG. 62 is a view similar to FIG. 59, showing the seat cushion subassembly when and so long as the seat occupant is sitting thereon.
Figure 63:
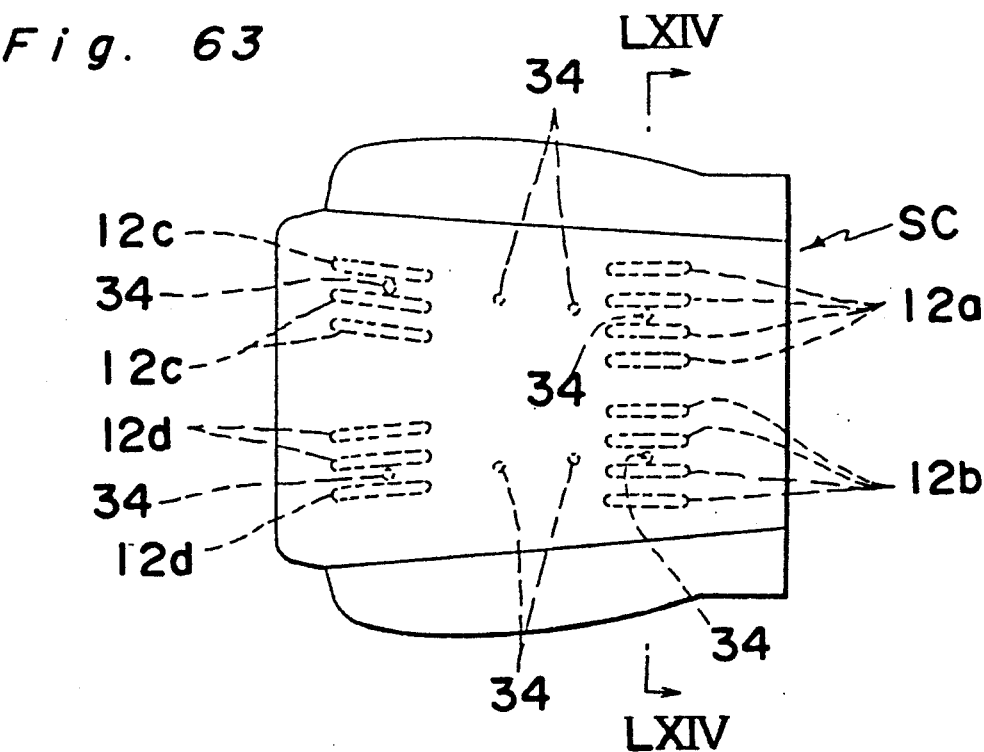
FIG. 63 is a schematic top plan view of the seat cushion subassembly according to a seventh preferred embodiment of the present invention.

To render the seat cushion subassembly SC to be stiffened for the seat occupant of relatively big build, the internal pressures in the respective flexible expandable tubings 14 are to be increased. According to the instant embodiment of the present invention, the control of the internal pressures in the respective flexible expandable tubings 14 is carried out in such a manner that some of the flexible expandable tubings 14 which support the ischial tuberosities Ma' in the lower body part of the seat occupant Xb can be stretched in a by an amount greater than the remaining flexible expandable tubings 14 are stretched as shown in FIG. 62. Consequently, that portion of the seat cushion subassembly SC which corresponds in position to the ischial tuberosities Ma' in the lower body part of the seat occupant Xb can be stiffened as can be understood from a curve shown by the broken line in the graph of FIG. 61.

Thus, according to the sixth preferred embodiment of the present invention shown in and described with reference to FIGS. 47 to 62, the system is so designed that, in dependence on the pressure detected by the load cells 16 operable to detect the pressures imposed at various sites on the seat cushion subassembly SC by the seat occupant, the controller Ctrl controls the internal pressures in the respective flexible expandable tubings 14 to substantially move the flexible expandable tubings 14 up or down in a controlled fashion. Accordingly, a pattern of distribution of pressure appropriate to a given physical build and figure of the seat occupant can be obtained. Also, since the seat cushion pad 12 is mounted so as to be supported by the flexible expandable tubings 14, the support for the seat cushion pad 12 can be substantially uniformly distributed in a direction widthwise of the seat assembly and, therefore, the optimum pattern of distribution of pressure once controlled can be maintained stable.

A seventh preferred embodiment of the present invention is shown in FIGS. 63 to 67, in which the seat cushion subassembly SC comprises a generally rectangular frame structure 10 similar to that best shown in FIG. 47 having a plurality of equally spaced springs 30 each connected at opposite ends to side frames of the frame structure so as to extend between such side frames, and a seat cushion pad 12 mounted over the frame structure 10 with a sitting area supported immediately above the springs 30 and covered by a seat covering 32.

Regions of the sitting area of the seat cushion pad 12 which would align with the ischial tuberosities and femurs in the lower body part of the seat occupant when the latter sits on the seat cushion subassembly SC are formed with pluralities of generally elongated pockets 12a, 12b, 12c and 12d so as to extend in a direction generally conforming to the longitudinal sense of the automobile body structure (not shown) and open upwardly, each of said elongated pockets 12a to 12d having a generally rectangular cross-sectional shape with its depth greater than the width thereof. Within these regions of the sitting area of the seat cushion subassembly SC and at respective locations which do not interfere with any pockets 12a to 12d, seat pressure sensors 34 are embedded in the seat cushion pad 12 for detecting respective loads imposed thereon by the seat occupant when the latter sits thereon.

Figure 67:
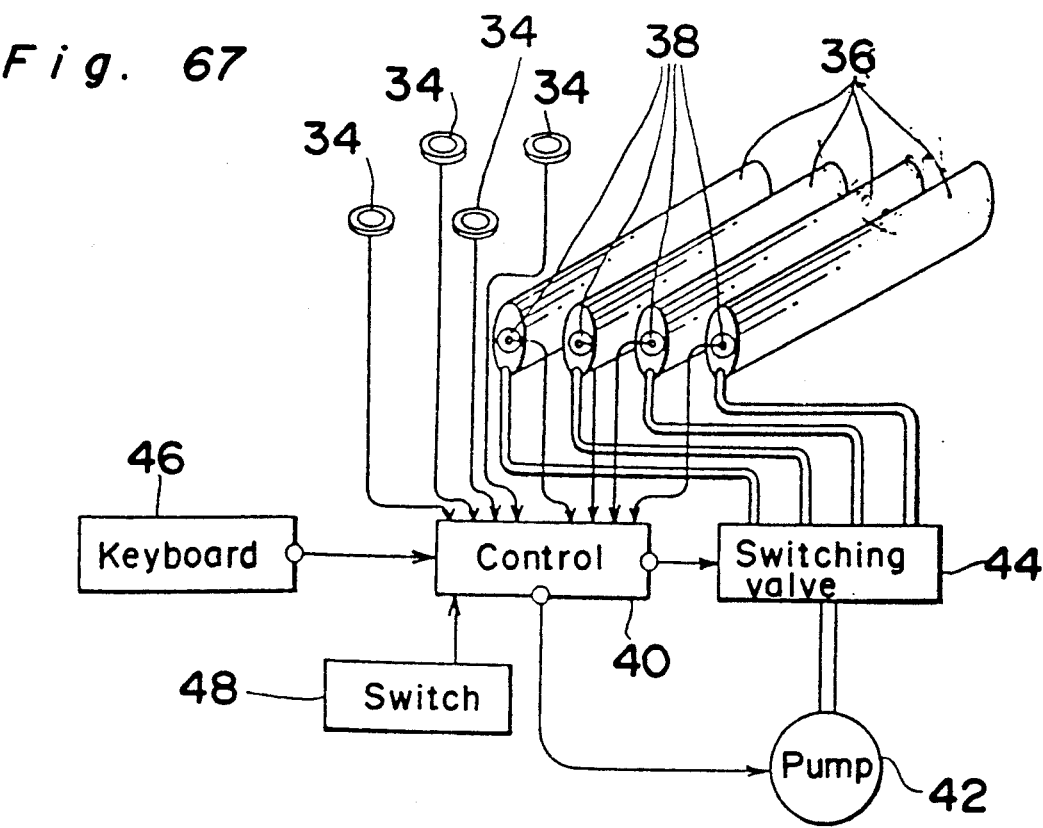
FIG. 67 is a diagram of a fluid control circuit used in association with the seat cushion subassembly according to the seventh embodiment of the present invention.

Sealed fluid tubes generally identified at 36 are accommodated within the elongated pockets 12a to 12d. As a matter of course, because of the presence of the seat covering 32, neither the elongated pockets 12a to 12d nor the fluid tubes 36 are visible to the seat occupant. Each of the fluid tubes 36 is so designed and so formed that, when the internal pressure thereof is increased, as will be described later, by the introduction of a fluid medium, for example, air, into the respective fluid tube 36, the respective fluid tube 36 can assume a generally elliptical cross-sectional shape as best shown in FIG. 67, and is fluid-coupled at one end with a respective tube pressure sensor 38 for detecting the internal pressure in the associated fluid tube 36. Output signals from the tube pressure sensors 38 and output signals from the seat pressure sensors 34 are supplied to a controller 40 which may be comprised of, for example, a microcomputer.

As best shown in FIG. 67, the controller 40 is so designed and so tailored as to provide, in response to the respective output signals from the seat pressure sensors 34 and the tube pressure sensors 36, respective control signals to a pump 42 and an electromagnetic switching valve 44 operable to control the supply of the fluid medium from the pump 42 towards the fluid tubes 36, to thereby control the internal pressures in the associated fluid tubes 36 so that an optimum pattern of distribution of pressure can be given from the seat cushion subassembly SC to the seat occupant.

In order for the seat occupant to adjust the pattern of distribution of pressure as desired and independently of the automatic control performed by the controller in response to the signals from the various sensors, the system shown in FIG. 67 is provided with a keyboard 46 which can be brought into operation under a manual mode when an override switch 48 is operated.

The seat cushion subassembly SC according to the seventh preferred embodiment of the present invention operates in the following manner.

Assuming that a seat occupant having a relatively big build sits on the seat cushion subassembly SC, and during an initial condition in which fluid medium has not yet been introduced into the fluid tubes 36, wall portions 12e of the seat cushion pad 12 defining the elongated pockets 12a and 12d are considerably compressed and deformed as best shown in FIG. 65, signifying that the seat cushion subassembly SC is too soft for such seat occupant.

Therefore, on the basis of the output signals from the seat pressure sensors 34, the controller 40 issues control signals respectively to the pump 42 and the electromagnetic switching valve 44 to supply controlled quantities of fluid medium into the respective fluid tubes 36 to cause the latter to be inflated as shown in FIG. 66. Consequent upon the inflation of the fluid tubes 36, the wall portions 12e of the seat cushion pad 12 defining the elongated pockets 12a to 12d are supported by the inflated fluid tubes 36 so as to substantially stand erect as best shown in FIG. 66, thereby providing a stiffness to the regions of the lower body part of the seat occupant which correspond in position to the ischial tuberosities and the femurs so that the optimum pattern of distribution of pressure can be obtained from the seat cushion subassembly SC.

According to the seventh preferred embodiment of the present invention, since the internal pressures in the respective fluid tubes 36 ca be controlled by controlling the flow of the fluid medium from the pump 42 to the fluid tubes 36 by means of the controller 40 in dependence on the pressures detected by the seat pressure sensors 34, the pattern of distribution of pressure appropriate to a given build and figure of the seat occupant can be obtained. Also, since the fluid tubes 36 are accommodated within the elongated pockets 12a to 12d defined in the seat cushion pad 12, no extra support member for the mounting and support of the fluid tubes 36 is required.

In addition, according to the seventh preferred embodiment of the present invention, since the fluid tubes 36 are so designed and so shaped that, when the fluid tubes 36 are inflated by the introduction of the fluid medium into the fluid tubes 36, the inflated fluid tubes 36 back up the wall portions 12e of the seat cushion pad 12, thereby enabling the wall portions 12e to support a load imposed by the seat occupant, the seat occupant will not feel a sense of incongruity.

It is to be noted that, although the pluralities of the pockets 12a to 12d have been shown and described as generally elongated and extending generally lengthwise of the automobile body structure, the pockets 12a to 12d may be in the form of generally concentrically arranged annular pockets, as shown in FIG. 68, within the specific regions referred to above.

With particular reference to FIGS. 69 to 72, an eighth preferred embodiment of the present invention will now be described.

Figure 70:
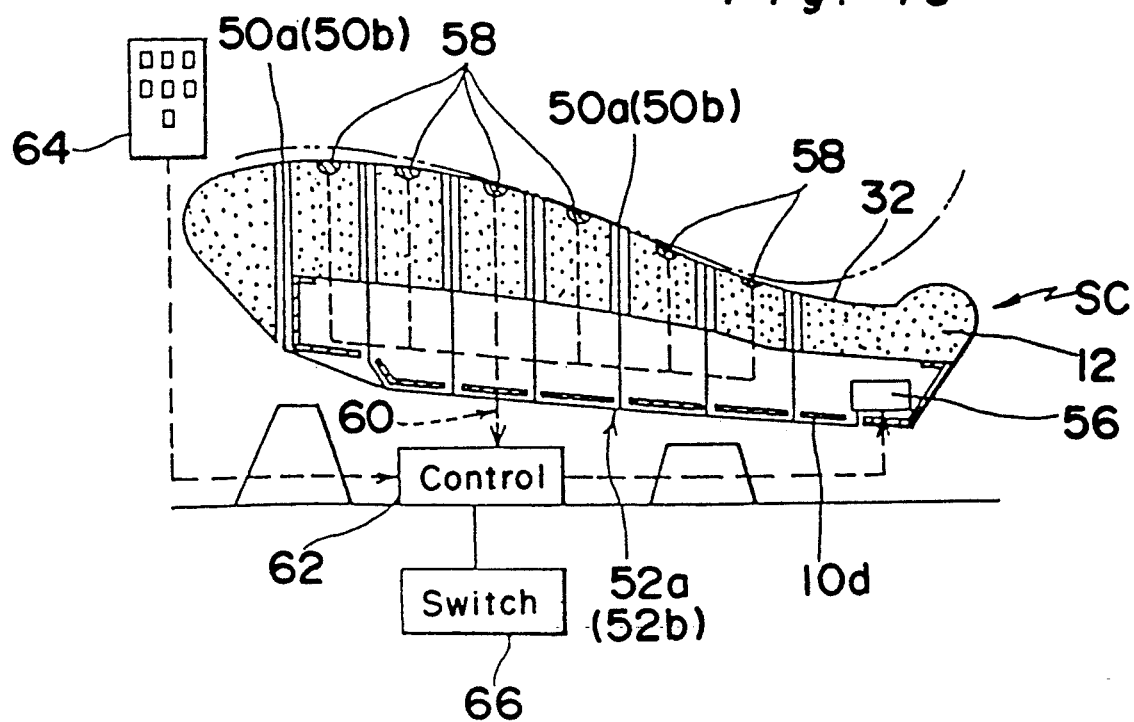
FIG. 70 is a cross-sectional view, on an enlarged scale, taken along the line LXX—LXX in FIG. 69.
Figure 71:
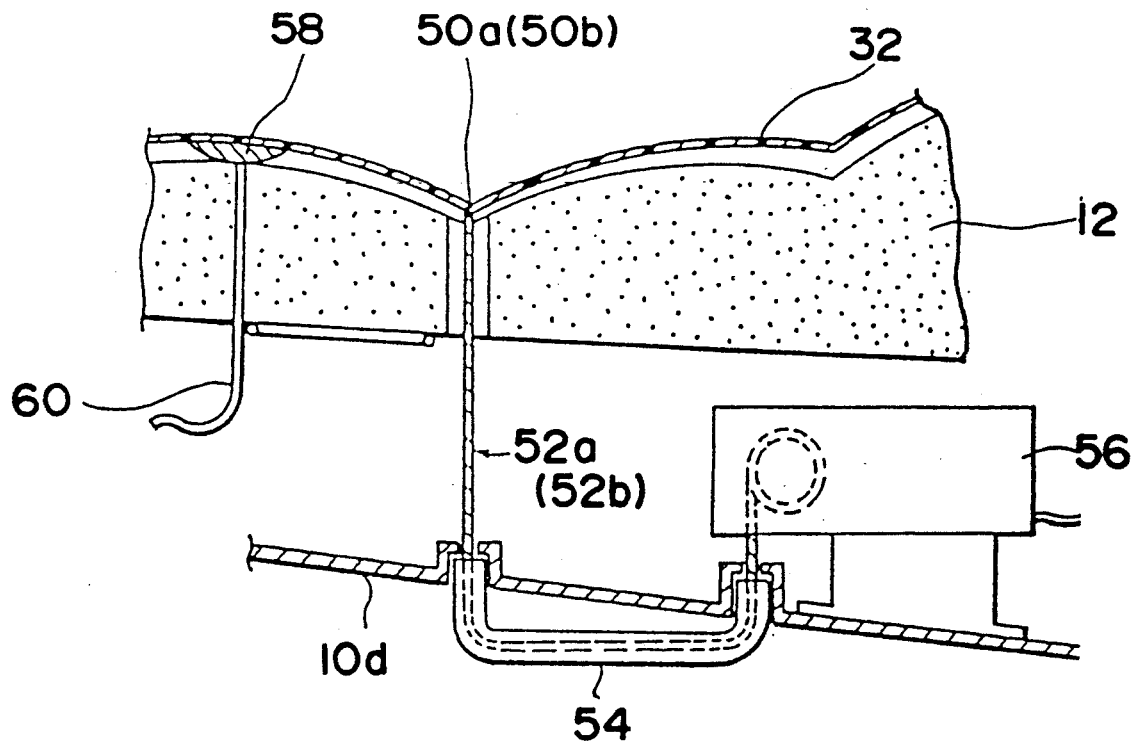
FIG. 71 is a fragmentary sectional view, on an enlarged scale, of a portion of the seat cushion subassembly shown in FIG. 70, showing how one cable is coupled with an associated motor-driven cable winder.

In this eighth embodiment of the present invention, an inner surface of the seat covering 32 that is held in contact with the seat cushion pad 12 has left and right rows of equally spaced anchor points 50a and 50b defined therein for a purpose that will become clear from the subsequent description. The left and right rows of the anchor points 50a and 50b extend in a direction generally parallel to the longitudinal axis of the automobile body structure and are defined at respective locations which will align with the femurs, including regions of the ischial tuberosities, in the lower body part of the seat occupant when the latter sits on the seat cushion subassembly SC. For each row of the anchor points 50a or 50b, a plurality of cables 52a or 52b are connected at one end with the anchor points 50a or 50b of each row and extend therefrom downwardly through the seat cushion pad 12 and then through generally U-shaped guide sleeves 54 by way of a bottom panel 10d secured from below to the frame structure 10 as best shown in FIGS. 70 and 71. The cables 52a or 52b slidably extending through the respective guide sleeves 54 are in turn connected to associated motor-driven cable winders 56.

Figure 69:
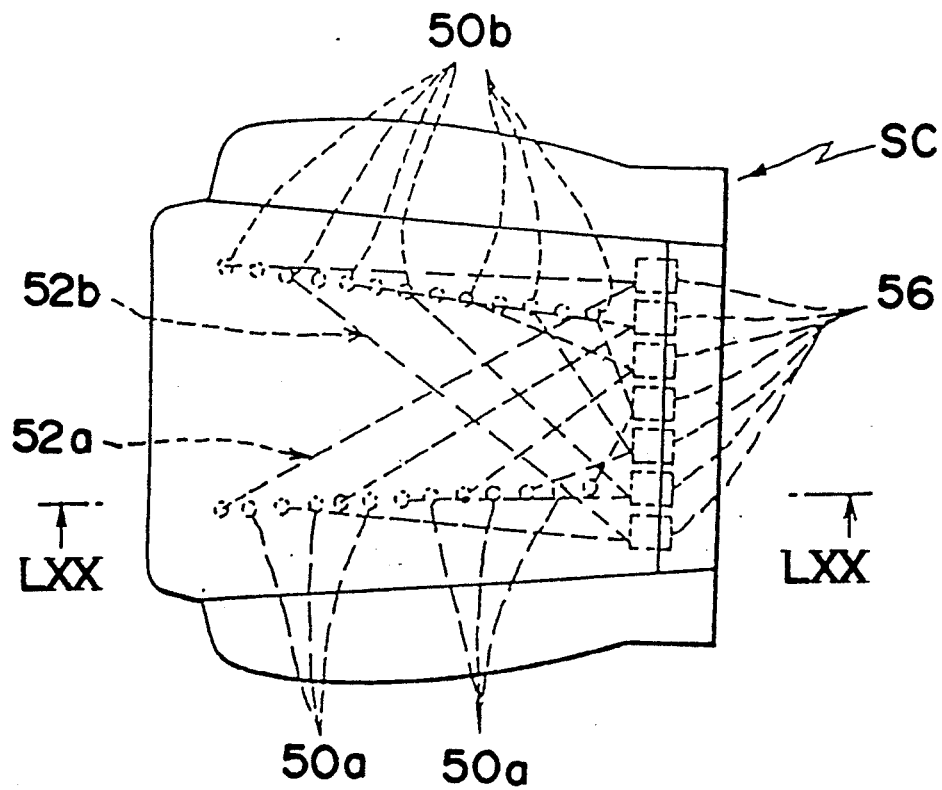
FIG. 69 is a schematic top plan view of the seat cushion subassembly showing an eighth preferred embodiment of the present invention.

It is to be noted that, as best shown in FIG. 69, each two cables 52a and 52b, connected respectively at one end to one of the anchor points 50a of the left row and one of the anchor points 50b of the right row which is aligned and therefore paired therewith, are adapted to be selectively wound and unwound by the same motor-driven cable winder 56. It is also to be noted that the motor-driven cable winders 56 equal in number to the number of the cables 52a or 52b associated with each row of the anchor points 50a or 50b are fixedly mounted on the bottom panel 10d of the frame structure 10 at a location generally below the rear end of the seat cushion subassembly SC as shown in FIGS. 69 and 70.

A seat pressure sensor 58 is disposed between the upper surface of the seat cushion pad 12 and the seat covering 32, or otherwise embedded in an upper surface region of the seat cushion pad 12 adjacent the seat covering 32, and is positioned between each adjacent pair of anchor points 50a and 50b of each row. The seat pressure sensors 58 are operable to detect a load imposed by the seat occupant at portions of the seat cushion subassembly SC which correspond to the positions of such seat pressure sensors 58, when the seat occupant sits on the seat cushion subassembly SC.

Electric lines 60 leading from the associated seat pressure sensors 58 are connected to a controller 62, which may be comprised of a microcomputer, for interfacing signals between the controller 62 and the seat pressure sensors 58.

The system according to the eighth embodiment of the present invention is so designed and so programmed as to operate in the following manner.

Figure 72:
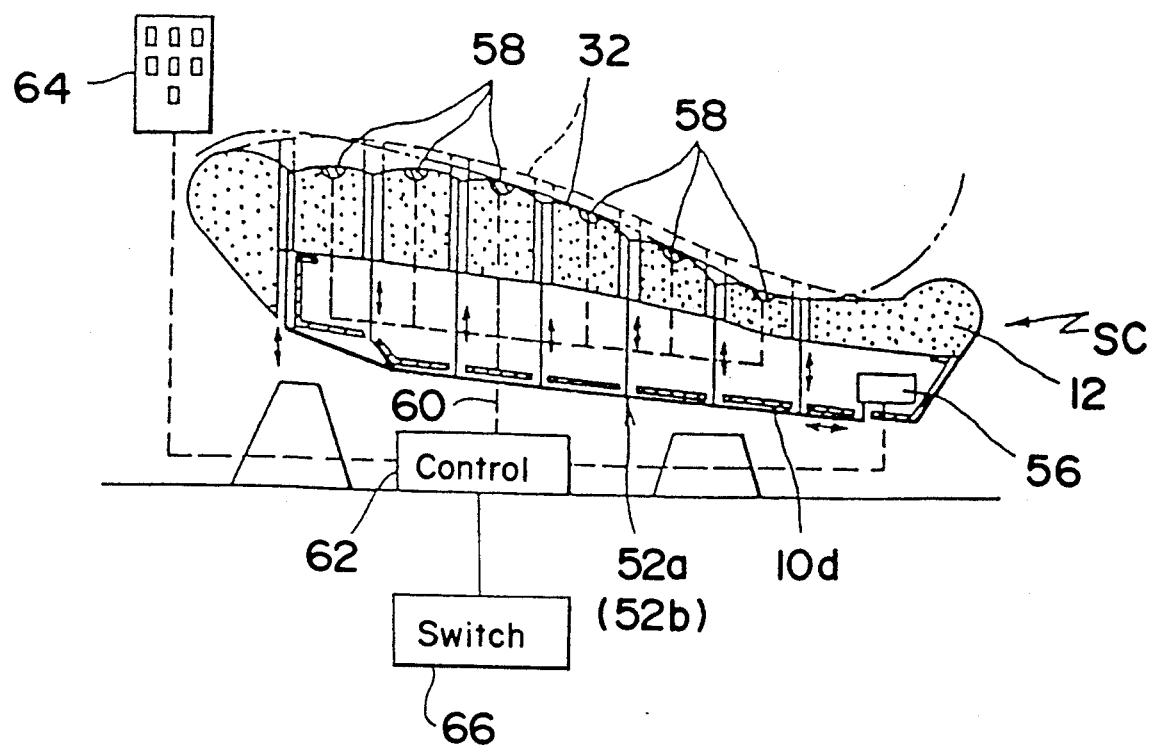
FIG. 72 is a view similar to FIG. 70, showing a condition when the seat occupant sits on the seat cushion subassembly and the cables are wound up.

When the seat occupant actually sits on the seat cushion subassembly SC, the controller 62 infers the build and figure of the seat occupant on the basis of the output signals supplied from the seat pressure sensors 58 and generates, on the basis of a result of inference performed by the controller 62, individual control signals which are in turn supplied to some or all of the motor-driven cable winders 56 to drive the latter and to control the lengths of the paired cables 52a and 52b to be wound. As a result thereof, as best shown in FIG. 72, some or all of the left and right rows of the anchor points 50a and 50b are drawn downwards a distance corresponding to the length of the paired cables 52a and 52b which have been wound by the associated motor-driven cable winders 56, and accordingly, the seat cushion subassembly SC can be depressed at localized areas to a shape corresponding to the shape of the glutea region and dorsal femoral regions of the seat occupant to provide a comfortable support.

In order for the seat occupant to adjust the pattern of distribution of pressure as desired and independently of the automatic control performed by the controller in response to the signals from the various pressure sensors, the system according to the eighth embodiment of the present invention is also provided with a keyboard 64 which can be brought into operation under a manual mode when an override switch 66 is operated.

As hereinbefore described, according to the eighth embodiment of the present invention, the motor-driven cable winders 56 for winding some or all of the paired cables 52a and 52b can be controlled in dependence on the pressure detected by each seat pressure sensor 58 and, therefore, the sitting area of the seat cushion subassembly can be adjusted selectively up and down to provide a configured seat comfortable to sit on. Since the selective up and down movement of the sitting area of the seat cushion subassembly is carried out by means of the paired cables 52a and 52b, it is possible to cause the seat cushion subassembly to maintain a pattern of distribution of pressure once established as a result of the actual sitting of the seat occupant on the seat cushion subassembly.

Although the present invention has been fully described in connection with the preferred embodiments thereof with reference to accompanying drawings, it is to be noted that various changes and modifications are apparent to those skilled in the art. Such changes and modifications ar to be understood as included within the scope of the present invention as defined by the appended claims unless they depart therefrom.

What is claimed is:

1. A seat cushion subassembly comprising:
   a cushioning layer defining a sitting area on which a seat occupant is to sit, said cushioning layer being deformable in response to the seat occupant sitting on said sitting area;
   means for maintaining said cushioning layer in a deformed shape, resulting from the seat occupant sitting on said sitting area, after the seat occupant leaves said sitting area;
   an outer layer separate from and positioned over said cushioning layer and deformable therewith in response to the seat occupant sitting on said sitting area; and
   a plurality of spring means, operatively positioned with respect to said outer layer and said cushioning layer, for restoring said outer layer away from said cushioning layer to an original shape of said outer layer upon the seat occupant leaving said seat area while said cushioning layer remains in said deformed shape.

2. A seat cushion subassembly as claimed in claim 1, wherein said spring means comprises a plurality of wire springs connected to said subassembly.

3. A seat cushion subassembly as claimed in claim 2, wherein said wire springs extend in a widthwise direction of said seat cushion.

4. A seat cushion subassembly as claimed in claim 2, wherein said wire springs are mounted on a layer surface of said outer layer.

5. A seat cushion subassembly as claimed in claim 2, wherein said wire springs have a wave configuration.

6. A seat cushion subassembly as claimed in claim 1, wherein said spring means comprise a plurality of leaf springs connected to said subassembly.

7. A seat cushion subassembly as claimed in claim 6, wherein said leaf springs extend in a widthwise direction of said seat cushion.

8. A seat cushion subassembly as claimed in claim 6, wherein said leaf springs are mounted on a lower surface of said outer layer.

* * * * *